United States Patent
Wakahara

(10) Patent No.: US 8,027,061 B2
(45) Date of Patent: Sep. 27, 2011

(54) SECURITY ENCODING UNIT AND IMAGE FORMING APPARATUS INCLUDING SAME

(75) Inventor: Shinichi Wakahara, Yamato (JP)

(73) Assignee: Ricoh Company, Ltd., Tokyo (JP)

( * ) Notice: Subject to any disclaimer, the term of this patent is extended or adjusted under 35 U.S.C. 154(b) by 655 days.

(21) Appl. No.: 12/132,182

(22) Filed: Jun. 3, 2008

(65) Prior Publication Data

US 2009/0049072 A1 Feb. 19, 2009

(30) Foreign Application Priority Data

Jun. 8, 2007 (JP) .................................. 2007-152521

(51) Int. Cl.
*H04N 1/40* (2006.01)
(52) U.S. Cl. ......................................... 358/1.9; 358/468
(58) Field of Classification Search ................... 358/1.9, 358/2.1, 3.28, 468, 1.14–1.16
See application file for complete search history.

(56) References Cited

U.S. PATENT DOCUMENTS

| 5,629,990 A | 5/1997 | Tsuji et al. |
| 2007/0081694 A1 | 4/2007 | Ryan, Jr. |
| 2007/0097411 A1 | 5/2007 | Kondo et al. |

FOREIGN PATENT DOCUMENTS

| EP | 1 024 414 A1 | 8/2000 |
| JP | 5-233873 | 9/1993 |
| JP | 3278471 | 2/2002 |
| JP | 2002-109527 | 4/2002 |
| JP | 2004-200897 | 7/2004 |
| JP | 2004-274092 | 9/2004 |
| JP | 2006-13882 | 1/2006 |
| JP | 2006-13924 | 1/2006 |
| JP | 2006-80941 | 3/2006 |
| JP | 2006-254354 | 9/2006 |
| JP | 2006-287902 | 10/2006 |

*Primary Examiner* — Thomas D Lee
*Assistant Examiner* — Stephen M Brinich
(74) *Attorney, Agent, or Firm* — Oblon, Spivak, McClelland, Maier & Neustadt, L.L.P.

(57) ABSTRACT

A security encoding unit performs security encoding processing on a plurality of images simultaneously, for example, an image on a front side of the document and an image on a back side of the document. The security encoding unit includes at least a first detector for detecting first security information of a first image based on a first original image data, a second detector for detecting second security information of a second image based on a second original image data, a first security encoding device for performing security encoding processing on the first original image data to generate the first image data, and a second security encoding device for performing security encoding processing on the first original image data to generate the second image data. The first original image data of the first image and the second original image data of the second image are input simultaneously.

18 Claims, 17 Drawing Sheets

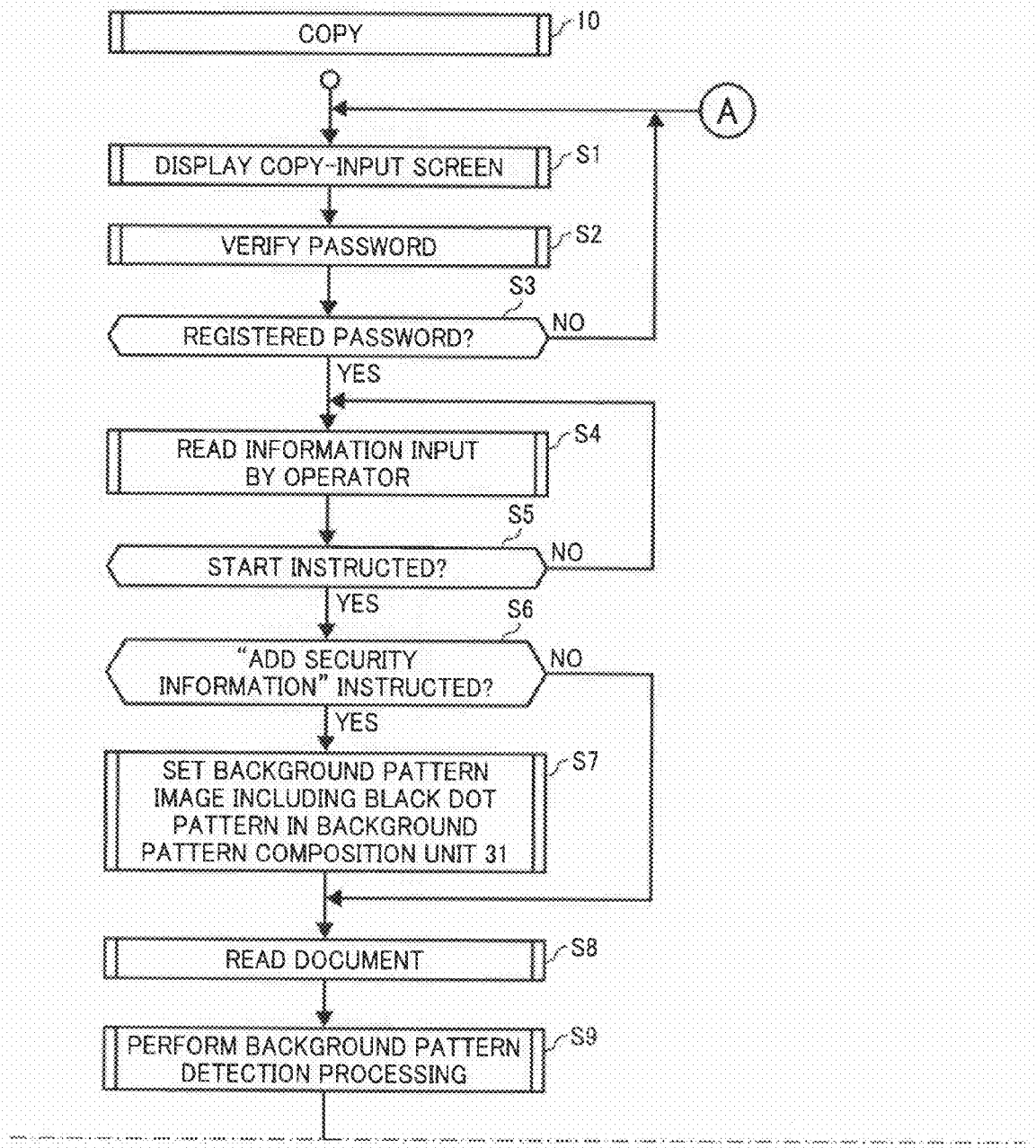

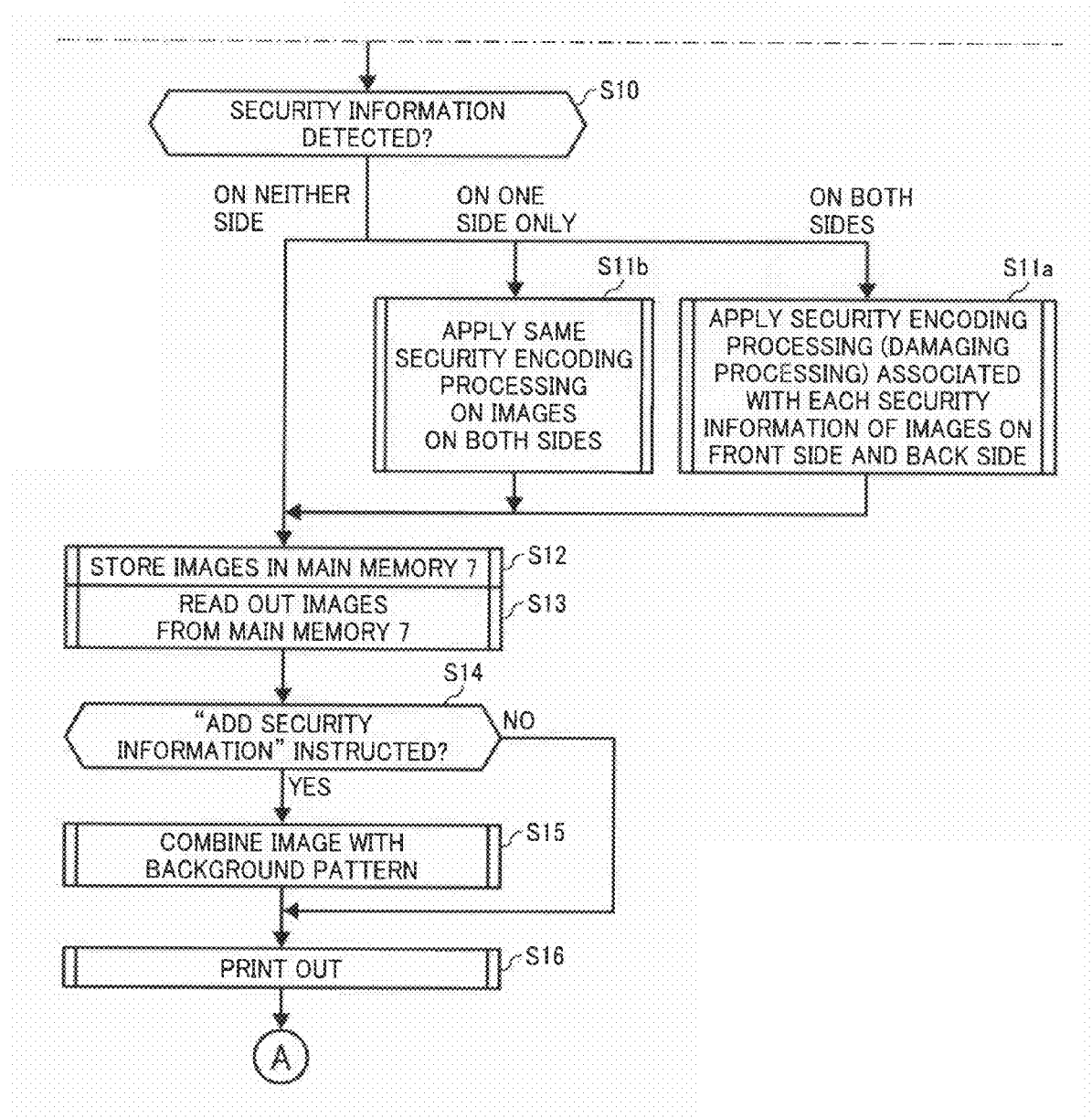

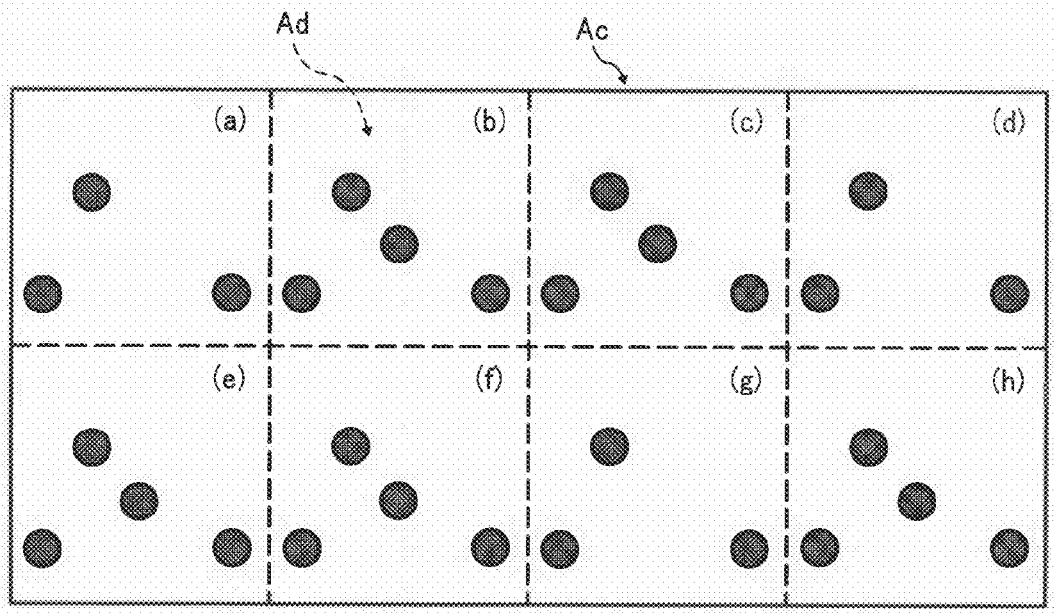

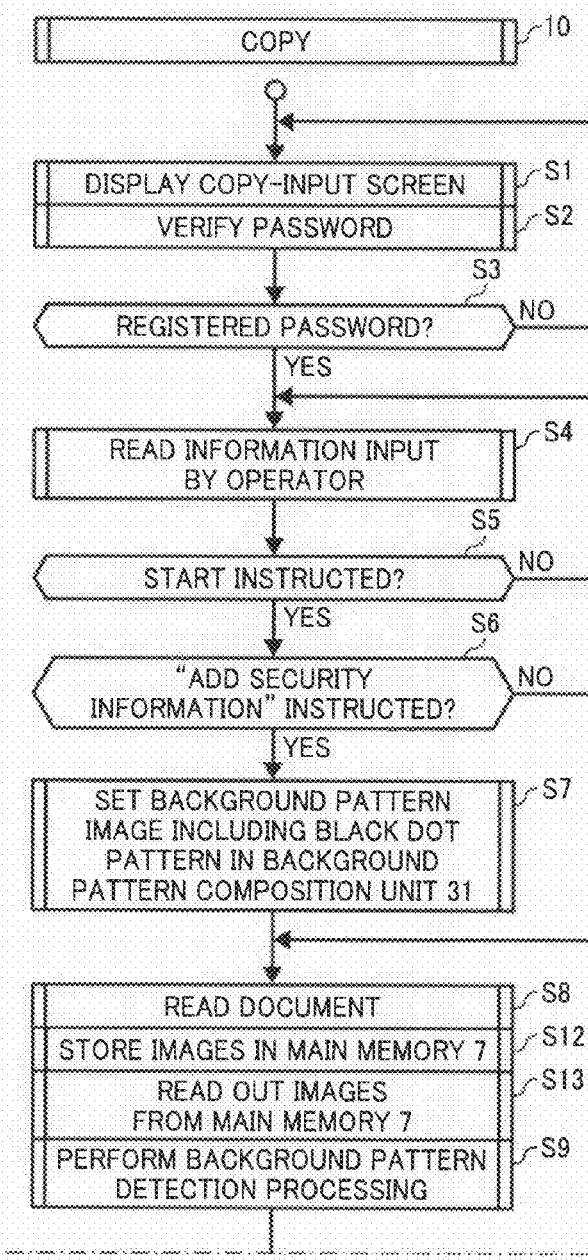

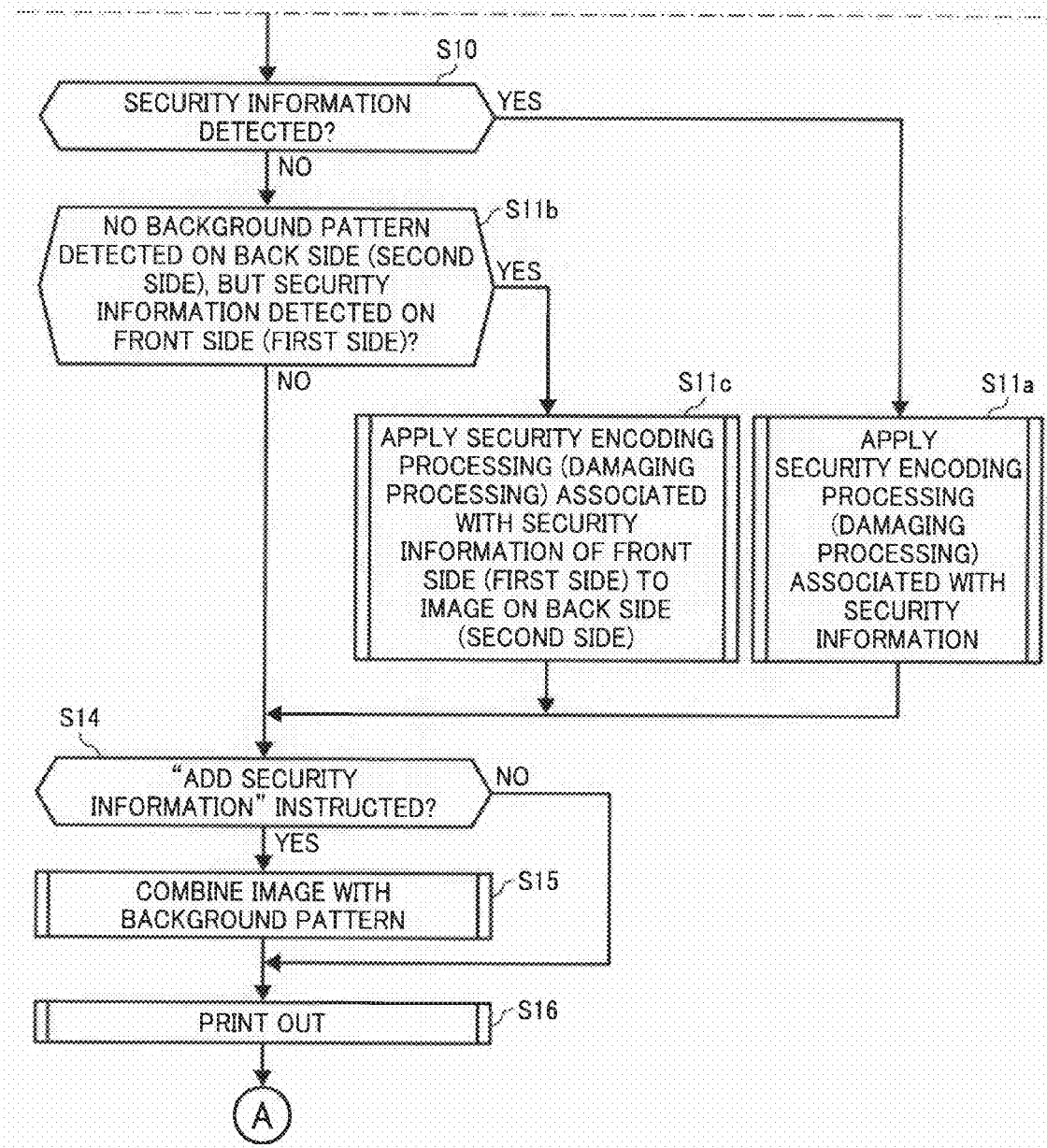

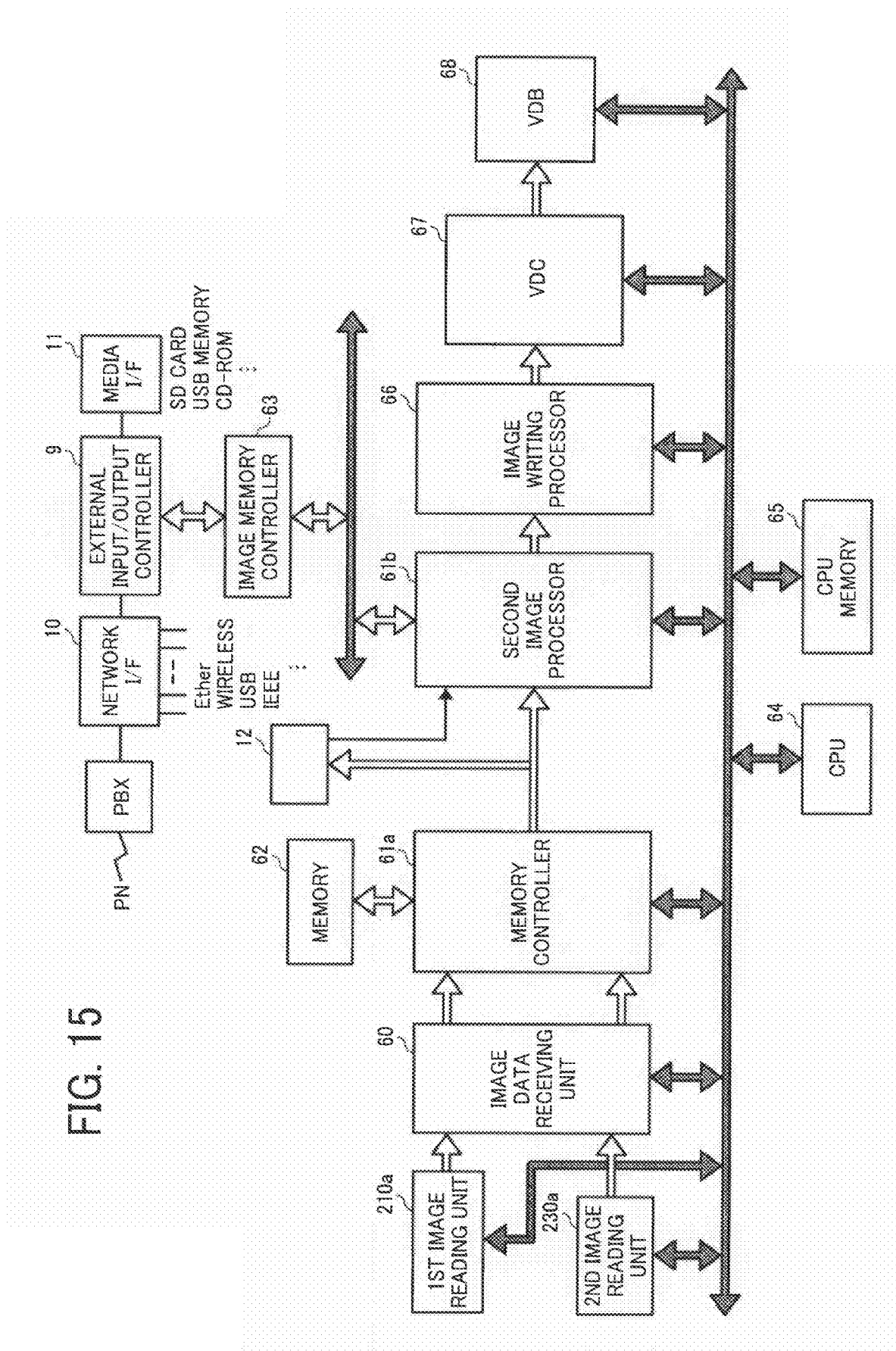

SECURITY ENCODING UNIT AND IMAGE FORMING APPARATUS INCLUDING SAME

CROSS-REFERENCE TO RELATED APPLICATION

This patent application is based on and claims priority pursuant to 35 U.S.C. §119 from Japanese Patent Application No. 2007-152521 filed on Jun. 8, 2007 in the Japan Patent Office, the entire contents of which are hereby incorporated herein by reference.

BACKGROUND OF THE INVENTION

1. Field of the Invention

Exemplary aspects of the present invention generally relate to a security encoding unit and an image reading unit using the same, and an image forming apparatus including the image reading unit.

2. Description of the Background Art

To protect the confidentiality of certain types of information, particularly documents, methods are known of prohibiting unauthorized copying of such documents by inserting various types of encoded security information in the document. Subsequently, when such encoded security information is detected in an attempt to copy the document, copying is either prevented from starting or discontinued if already started.

In particular, Japanese Patent Unexamined Patent Application Publication No. 2004-274092 discloses a method and an apparatus for protecting the security of a document by prohibiting output of an image when a background pattern of a document image is detected.

A background pattern is detected so as to create security encoding instruction information, and a determination as to whether or not a document image is a copy prohibited image is made based on the security encoding instruction information thus created. When a problem is detected by a background pattern recognition unit, an image forming apparatus stops reading the document and also stops forming an image of the document.

Similarly, Japanese Patent Unexamined Patent Application Publication No. 2006-287902 discloses an image processor that prevents unauthorized copying of a document by displaying document property information through not only a background pattern shape embedded in the document but also by a color of the background pattern.

Various refinements of the basic method described above are also known. Thus, for example, Japanese Patent Unexamined Patent Application Publication No. 2006-13882 discloses an image reading apparatus which simultaneously reads images formed on both a front side and a back side of a document, and stores the image data in a memory. Japanese Patent Unexamined Patent Application Publication No. 2002-109527 discloses a multifunction copier in which images formed on both a front side and a back side of a document are simultaneously read, and digitized image data is stored in a memory in a time-division writing scheme using a single channel. Japanese Patent No. 3278471 discloses an area discriminating method (that is, extraction of an image region) which distinguishes between a text region in an image and a non-text region which is not the text region, but may include an image, for example, a picture.

However, the foregoing examples may leave unaddressed certain desired requirements relating to reliable security encoding.

For example, when a plurality of images is simultaneously input, it is desirable that security encoding processing is securely performed on each image. In such a case, when the security information of the plurality of images is detected using the same parameter, there is a possibility that even though the security information of one image is accurately detected, the security information of the other image may not be accurately detected because the input processing characteristics of the plurality of images are different.

Furthermore, it is desirable that the security information of the plurality of images is accurately detected using fewer security information detectors than the number of images to be detected.

Still further, in a case in which one image includes the security information and the other image does not include such security information, it is desirable that the security encoding processing still be performed on the image including no security information as is performed on the image including the security information to provide enhanced security for the information contained in the document.

SUMMARY OF THE INVENTION

Exemplary embodiments of the present invention provide a security encoding unit and an image reading unit using the same, and an image forming apparatus including the image reading unit.

In one exemplary embodiment, a security encoding unit includes a first image input unit, a second image input unit, an image memory, a controller, a first detector, a second detector, a first security encoding device, and a second security encoding device. The first image input unit is configured to input first original image data of a first image. The second image input unit is configured to input second original image data of a second image. The controller is configured to store, in the image memory, either the first original image data and the second original image data, or first image data of the first image and second image data of the first image on which security encoding processing is performed. The first detector is configured to detect first security information of the first image based on the first original image data. The second detector is configured to detect second security information of the second image based on the second original image data. The first security encoding device is configured to perform security encoding processing on the first original image data so as to generate the first image data. The second security encoding device is configured to perform security encoding processing on the second original image data so as to generate the second image data. The first original image data of the first image and the second original image data of the second image are input simultaneously.

Another exemplary embodiment provides a security encoding unit including a first image input unit, a second image input unit, an image memory, a controller, a detector, and a security encoding device. The first image input unit is configured to input first original image data of a first image. The second image input unit is configured to input second original image data of a second image data. The controller is configured to store in the image memory the first original image data and the second original image data, read out either the first original image data or the second original image data, and then read out the other first or the second original image data. The detector is configured to detect first security information of the first image based on the first original image data which is read out from the image memory and second security information of the second image based on the second original image data which is read out from the image memory. The security encoding processor is configured to perform security encoding processing associated with the first security information on the first original image data so as to generate first image data, and perform security encoding processing associated with the second security information on the second original image data so as to generate second image data. The first original image data of the first image and the second original image data of the second image are input simultaneously.

Additional features and advantages of the present invention will be more fully apparent from the following detailed description of exemplary embodiments, the accompanying drawings and the associated claims.

BRIEF DESCRIPTION OF THE DRAWINGS

A more complete appreciation of the disclosure and many of the attendant advantages thereof will be readily obtained as the same becomes better understood by reference to the following detailed description of exemplary embodiments when considered in connection with the accompanying drawings, wherein:

FIGS. 7A and 7B are flowcharts illustrating a single continuous exemplary copy operation control procedure performed by a CPU, according to an exemplary embodiment of the present invention;

FIG. 9A is a diagram illustrating a background pattern representing security information, according to an exemplary embodiment of the present invention;

FIG. 9B is a block diagram illustrating a security code (security encoding instruction data) including the background pattern of FIG. 9A, according to an exemplary embodiment of the present invention;

FIGS. 14A and 14B are flowcharts illustrating a single continuous exemplary copy operation control procedure performed by a CPU, according to still another exemplary embodiment of the present invention; and FIG. 15 is a block diagram illustrating a text/image information processing system, according to still another exemplary embodiment of the present invention.

DETAILED DESCRIPTION OF EXEMPLARY EMBODIMENTS

Figure 1:
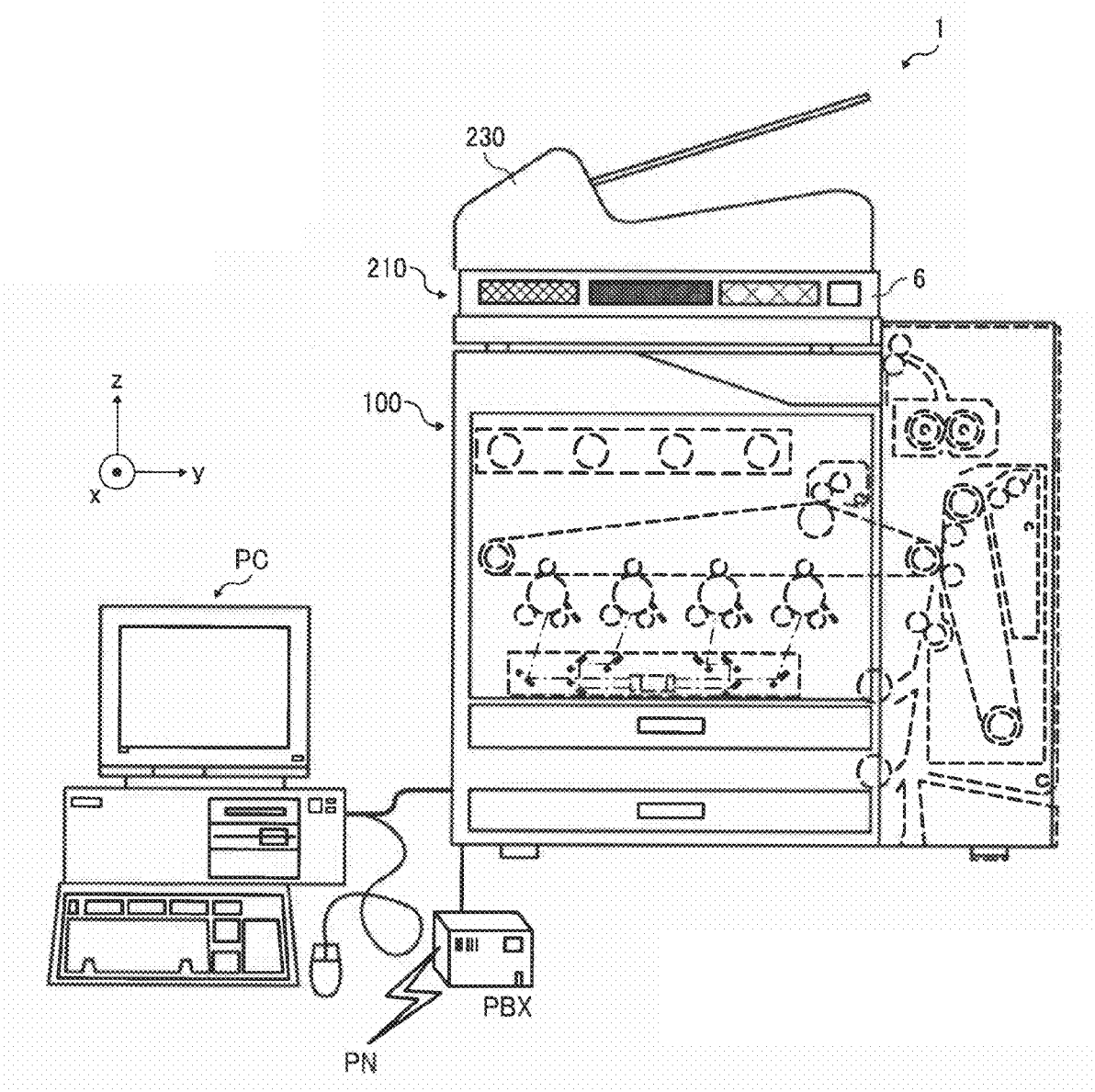
FIG. 1 is a front view illustrating an exemplary configuration of an image forming apparatus, for example, a multifunction copier 1, according to an exemplary embodiment of the present invention.

In describing exemplary embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve a similar result.

Exemplary embodiments of the present invention are now described below with reference to the accompanying drawings.

In a later-described comparative example, exemplary embodiment, and alternative example, for the sake of simplicity of drawings and descriptions, the same reference numerals will be given to constituent elements such as parts and materials having the same functions, and redundant descriptions thereof omitted.

Typically, but not necessarily, paper is the medium from which is made a sheet on which an image is to be formed. It should be noted, however, that other printable media are available in sheet form, and accordingly their use here is included. Thus, solely for simplicity, although this Detailed Description section refers to paper, sheets thereof, paper feeder, etc., it should be understood that the sheets, etc., are not limited only to paper, but includes other printable media as well.

Referring now to the drawings, wherein like reference numerals designate identical or corresponding parts throughout the several views, and initially to FIG. 1, one example of an image forming apparatus, for example, a full-color digital multifunction copier according to an exemplary embodiment of the present invention is described.

Exemplary Embodiment 1

FIG. 1 illustrates an external view of an image forming apparatus 1, for example, a full-color digital multifunction copier, according to an exemplary embodiment of the present invention.

The image forming apparatus 1 includes at least an automatic document feeder (ADF) 230, an operation panel 6, a color scanner 210, and a color printer 100. The operation panel 6 and the ADF 230 attached to the color scanner 210 are detachably provided to the printer 100.

Figure 4:
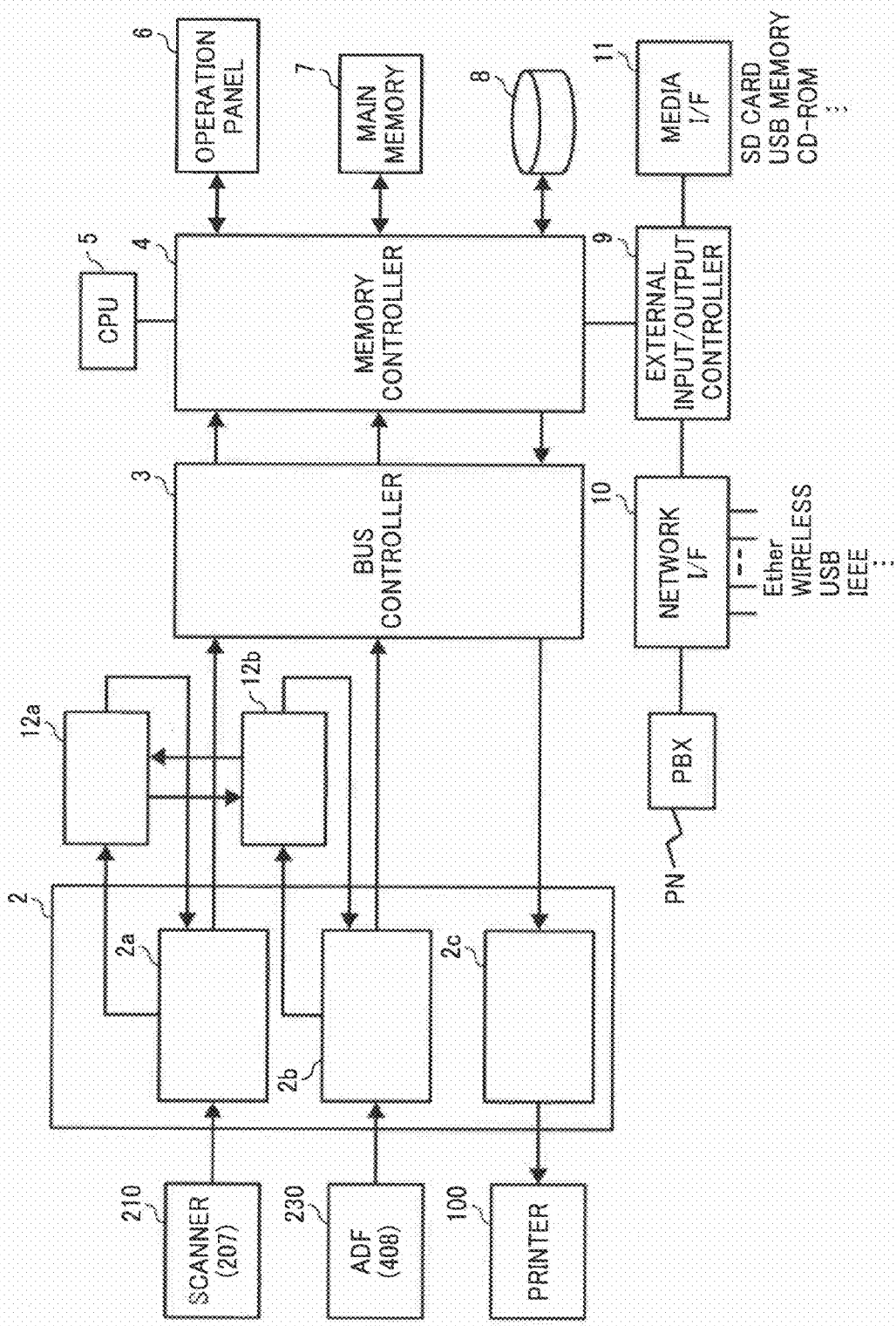
FIG. 4 is a block diagram illustrating a text and image information processing system of the image forming apparatus of FIG. 1, according to an exemplary embodiment of the present invention.

The color scanner 210 includes a power driver and a control board (not shown) equipped with a sensor input and a controller, and reads a document image by directly or indirectly communicating with a CPU 5 illustrated in FIG. 4 while timing of reading is controlled. After printing, a recording sheet serving as a recording medium is discharged onto a sheet stack 126 illustrated in FIG. 2.

Figure 2:
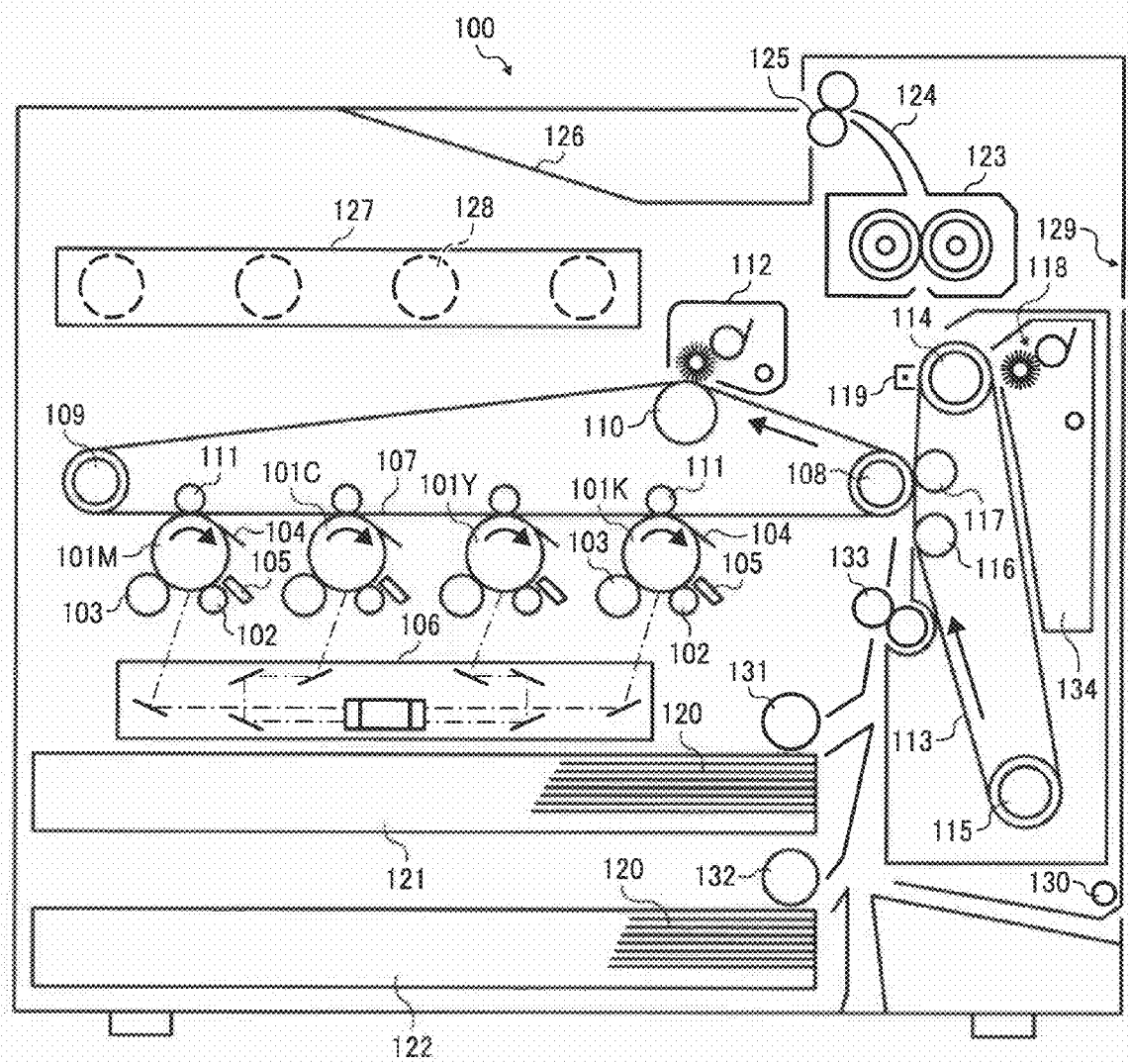
FIG. 2 is an enlarged vertical cross-sectional view illustrating a color printer of the image forming apparatus of FIG. 1, according to an exemplary embodiment of the present invention.

Referring now to FIG. 2, there is provided a schematic diagram illustrating the color printer 100 of the image forming apparatus 1.

The color printer 100 according to the present exemplary embodiment is a laser printer. The color printer 100 includes four sets of photoreceptors 101M, 101C, 101Y, and 101K serving as toner image forming units for forming images of magenta (M), cyan (C), yellow (Y), and black (K), respectively. The photoreceptors 101M, 101C, 101Y, and 101K are aligned along a primary transfer belt 107 in a direction of movement thereof from the left to the right in FIG. 2, respectively. The laser printer 100 is a four-drum type full color image forming apparatus.

The photoreceptors 101M, 101C, 101Y, and 101K are each rotatively supported and therefore rotate in a direction shown by an arrow. Surrounding each of the photoreceptors 101M, 101C, 101Y, and 101K are provided a charge neutralization device 105, a cleaning device 104, a charging device 102, and a developing device 103.

A space is secured between the charging device 102 and the developing device 103 so as to allow optical information emitted from an exposure device 106 to enter. There are four photoreceptors 101M, 101C, 101Y, and 101K according to the exemplary embodiment, each of which includes similar if not the same components as each other, except that the colors of toner used in the developing devices 103 are different.

Each photoreceptor 101 is formed of an aluminum cylinder having a diameter of approximately 30 mm to 100 mm. On the surface thereof is provided a layer formed of an organic semiconductor including optical conductive material. A portion of the photoreceptor 101 is in contact with the primary transfer belt 107. It should be noted that the shape of the photoreceptor is not limited to a cylinder shape, and alternatively, a belt-shape photoreceptor may be implemented.

The primary transfer belt 107 is movably and stretchedly disposed by rollers 108, 109, and 110 which rotate. The primary transfer belt 107 moves in a direction indicated by an arrow. Primary transfer mechanisms 111 are each provided in the vicinity of each of the photoreceptors 101M, 101C, 101Y, and 101K on the rear surface of the primary transfer belt 107 (an inner side of the loop.) The primary transfer belt 107 is a belt formed of a resin film or rubber base having a base thickness of from 50 µm to 600 µm, and has a resistance value which enables the toner to transfer from the photoreceptor 101.

On the outer surface of the belt loop is provided a belt cleaning device 112 for cleaning the primary transfer belt 107. The belt cleaning device 112 is configured to remove unnecessary toner remaining on the surface of the primary transfer belt 107 after transfer processing.

The exposure device 106 using a known laser method irradiates the uniformly charged surface of the photoreceptor 101 with light based on the optical information corresponding to the color image. Alternatively, an exposure device consisting of an LED array and an imaging mechanism may be used.

To the right of the primary transfer belt 107 in FIG. 2 is provided a secondary transfer belt 113. The secondary transfer belt 113 is movably and stretchedly disposed by rollers 114, 115, and 116. The secondary transfer belt 113 is movable in the direction indicated by the arrow.

On the rear side of the secondary transfer belt 113 (inner side of the belt loop) is provided a secondary transfer mechanism 117. On the outer side of the belt loop is provided a belt cleaning device 118 for cleaning the secondary transfer belt 113, a charger 119, and so forth. The belt cleaning device 118 removes unnecessary toner remaining on the secondary transfer belt 113 after the toner is transferred to the recording sheet.

The secondary transfer mechanism 117, the roller 116, and the roller 108 supporting the primary transfer belt 107 cause the primary transfer belt 107 and the primary transfer belt 113 to come into contact with each other, forming a predetermined transfer nip.

The secondary transfer belt 113 is a belt formed of a resin film or rubber base having a base thickness of from 50 µm to 600 µm, and has a resistance value which enables the toner to transfer from the primary transfer belt 107.

A sheet bundle 120 including the recording sheets is stored in sheet cassettes 121 and 122. A top sheet is picked up by a sheet feed roller 131 or a sheet feed roller 132 one by one, and transported to a registration roller 133 via a plurality of sheet guides.

Substantially above the secondary transfer belt 113 are provided a fixing unit 123, a sheet eject guide 124, a sheet eject roller 125, and the sheet catch tray 126.

Substantially above the primary transfer belt 107, but below the sheet catch tray 126, is provided a toner storage unit 127 which stores toner cartridges 128 for refill. The colors of toners in the toner cartridges 128 include magenta (M), cyan (C), yellow (Y), and black (K). The color toners are each supplied to the developing device 103 of the respective color by a powder pumping device or the like as needed.

A frame 129 constitutes a part of the color printer 100 and can be turned about a supporting shaft 130 to open to expose and make accessible the conveyance path of the recording sheet, thereby facilitating removal of a jammed recording sheet or the like.

A description will be now given of double-sided printing.

First, an image forming operation is performed by each of the photoreceptors 101M, 101C, 101Y, and 101K. The photoreceptors 101M, 101C, 101Y, and 101K are charged uniformly by the charging device 102. The charged photoreceptor 101M is irradiated with light emitted from an LD light source (not shown) of the exposure device 106 through optical components (not shown), and a latent image according to image information (color information) is written on the photoreceptor 101M.

Subsequently, the latent image on the photoreceptor 101M is developed by the developing device 103 with toner, thereby forming a visible image M (toner image) on the surface of the photoreceptor 101M. The toner image M is transferred onto the surface of the primary transfer belt 107 which is moved in synchrony with the photoreceptor 101M by the primary transfer mechanism 111. The toner remaining on the surface of the photoreceptor 101 is removed by the cleaning device 104. The surface of the photoreceptor 101M is discharged by the charge neutralization device 105 so as to prepare for the subsequent image forming operation.

The primary transfer belt 107 bears the toner image transferred onto the surface thereof and moves in the direction of the arrow. A latent image corresponding to a different color is written on the photoreceptor 101C and developed with the corresponding color of toner (cyan), thereby forming the toner image of cyan (toner image C) on the photoreceptor 101C. The toner image C is superimposed on the toner image M having been transferred onto the primary transfer belt 107. Ultimately, the toner images of four different colors are superimposed on one another. Alternatively, a monochrome (black) toner image may be formed.

In the meantime, the secondary transfer belt 113 moves in the direction of the arrow. The image formed on the surface of the primary transfer belt 107 is transferred onto the surface of the secondary transfer belt 113 by the secondary transfer mechanism 117.

While the image is formed on each of the photoreceptors 101M through 101K serving as the tandem-type image forming unit, the primary transfer belt 107 and the secondary transfer belt 113 move so as to proceed with a subsequent image forming operation, thereby making it possible to reduce total image forming time.

When the primary transfer belt 107 moves to the predetermined position, a toner image to be printed on the other side of the recording sheet is formed by the photoreceptor 101M in the manner described above. When the sheet feed roller 131 or 132 rotates in the counter-clockwise direction, the top sheet 120 in the sheet cassette 121 or 122 is picked up and transported to the registration roller 133.

The toner image on the surface of the primary transfer belt 107 is transferred by the secondary transfer mechanism 117 onto one side of the recording sheet transported between the primary transfer belt and the secondary transfer belt 113 via the registration roller 133. Subsequently, the recording sheet is transported further upward. The toner image on the secondary transfer belt 113 is transferred onto the other side of the recording sheet by the charger 119. Upon transfer, the recording sheet is transported at appropriate timing so that the recording sheet is aligned with the image.

According to the exemplary embodiment, the toner image formed by the photoreceptor 101 has a negative polarity. When the positive charge is supplied to the primary transfer mechanism 111, the toner image formed by the photoreceptor 101 is transferred onto the primary transfer belt 107. When the positive charge is supplied to the secondary transfer mechanism 117, the toner transferred onto the primary transfer belt 107 is transferred onto the secondary transfer belt 113.

Subsequently, the recording sheet is sent between the first transfer belt 107 and the secondary transfer belt 113. When the secondary transfer mechanism 117 is positively charged, the toner image transferred onto the primary transfer belt 107 is transferred on one side of the recording sheet. By supplying the positive charge to the toner image transferred onto the secondary transfer belt 113 by the charger 119, the negatively charged toner on the secondary transfer belt 113 is attracted to the other side of the recording sheet and transferred thereto.

Accordingly, the toner image is transferred onto each side of the recording sheet in a manner described above. The recording sheet is then sent to the fixing device 123 so that the toner images on both sides are fused and fixed at once. Subsequently, the recording sheet is discharged onto the sheet stack 126 at the upper portion of the frame 129 by the sheet eject roller 125 through the guide 124.

When a sheet eject portion including the sheet eject guide 124, the sheet eject roller 125, and the sheet catch tray 126 are provided in a manner illustrated in FIG. 2, the side (page) of the recording sheet on which the image is subsequently transferred, that is, the surface on which the image is directly transferred from the primary transfer belt 107, is stacked face down. Therefore, in order to align pages, the image to be transferred onto the second page is initially formed and transferred onto the secondary transfer belt 113. The image to be transferred onto the first page is directly transferred from the primary transfer belt 107.

The toner image to be directly transferred from the primary transfer belt 107 to the recording sheet is exposed such that the toner image is a normal image on the photoreceptor surface. The toner image to be transferred from the secondary transfer belt 113 to the recording sheet is exposed such that the toner image is a mirror image on the photoreceptor surface. Such an order of image forming operations for page alignment and image processing for switching between a normal image and a mirror image are performed by IMAC, which controls reading of the image data relative to a memory MEM.

After the image is transferred from the secondary transfer belt 113 to the recording sheet, unnecessary toner, paper dust and the like remaining on the secondary transfer belt 113 is removed by the belt cleaning device 118 including a brush roller, a collecting roller, a blade or the like.

In FIG. 2, the brush roller of the belt cleaning device 118 is separated from the surface of the secondary transfer belt 113. The brush roller is swingable about a supporting point 18a so that the brush roller may alternately contact and separate from the surface of the secondary transfer belt 113. When the secondary transfer belt 113 bears the toner image before the toner image is transferred to the recording sheet, the brush roller of the belt cleaning device 118 is separated from the surface of the secondary transfer belt 113. When cleaning needs to be performed, the brush roller swings in the counter-clockwise direction to contact the secondary transfer belt 113. The removed toner is collected in a toner waste storage unit 134.

The foregoing describes the image forming process in the double-sided printing mode when the image forming apparatus is set to "double-sided transfer mode". When the double-sided printing is performed, the above-described image forming process is performed. In short, there is only one mode.

By contrast, with single-side printing, there are two modes: "single-side transfer mode using the secondary transfer belt 113" and "single-side transfer mode using the primary transfer belt 107".

When the single-side transfer mode using the secondary transfer belt 113 is set, a superimposed four-color toner image or a monochrome toner image (black) formed on the primary transfer belt 107 is transferred onto the secondary transfer belt 113 and then transferred onto one side of the recording sheet. No image is transferred onto the other side of the recording sheet. In this case, the top surface of the printed recording sheet discharged to the sheet catch tray 126 includes the printed surface.

When the single-side transfer mode using the secondary transfer belt 107 is set, a superimposed four-color toner image or a monochrome toner image (black) formed on the primary transfer belt 107 is not transferred onto the secondary transfer belt 113, but is transferred onto one side of the recording sheet. No image is transferred onto the other side of the recording sheet. In this case, the bottom surface of the printed recording sheet discharged to the sheet catch tray 126 includes the printed surface.

Figure 3:
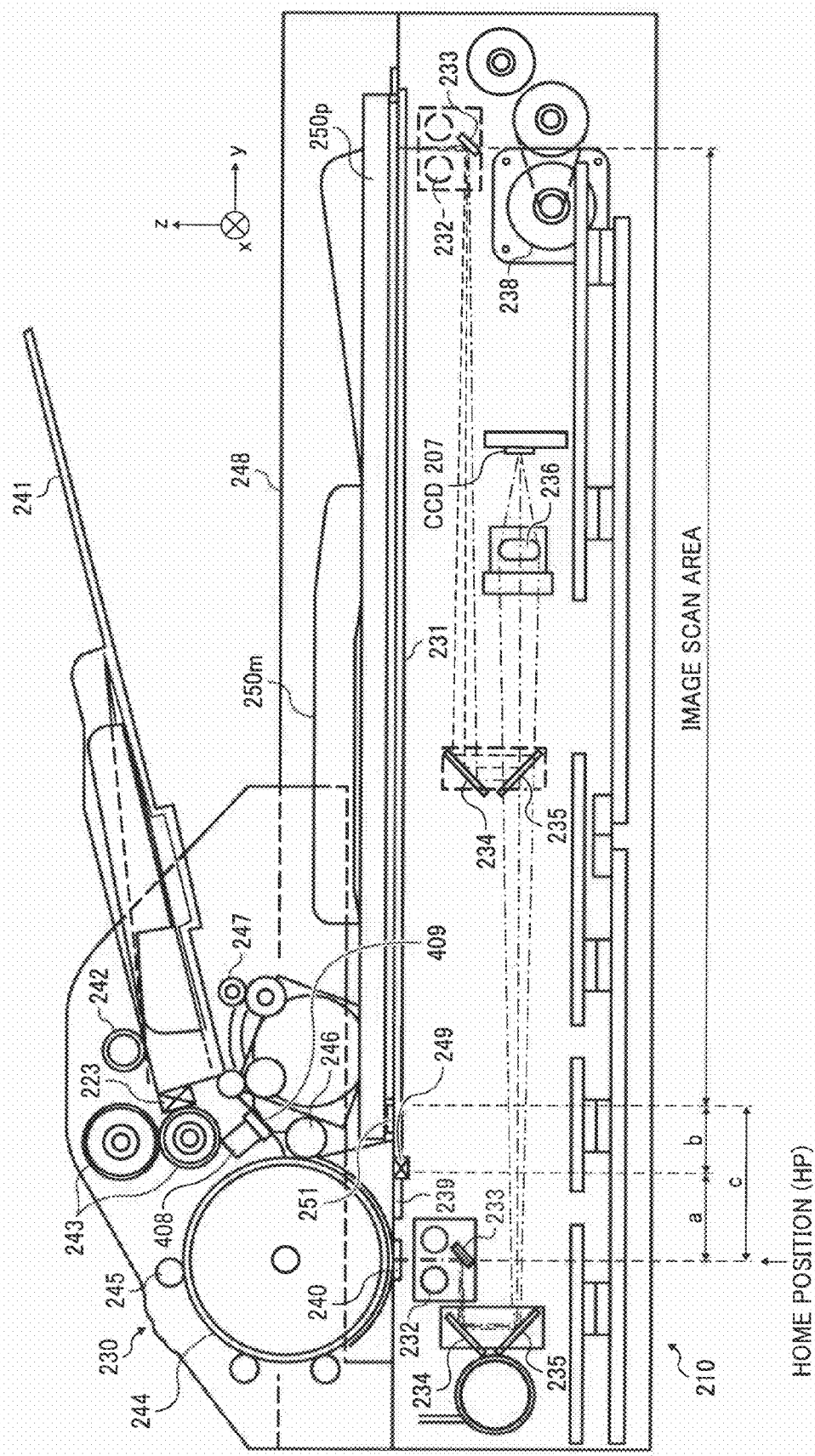
FIG. 3 is an enlarged vertical cross-sectional view illustrating a color scanner and an automatic document feeder (ADF) of FIG. 1, according to an exemplary embodiment of the present invention.

Referring now to FIG. 3, there is provided a schematic diagram illustrating a document image reading mechanism of the scanner 210 of the image forming apparatus 1 and the ADF 230 mounted on the scanner 210.

The document placed on a contact glass 231 of the scanner 210 is illuminated by an illumination lamp. The reflected light (image light) from the document is reflected parallel to a sub-scan direction y by a first mirror 233. The illumination lamp 232 and the first mirror 233 are mounted on a first carriage, not shown, which is driven in the sub-scan direction y at a constant speed. A second mirror 234 and a third mirror 235 are mounted on a second carriage, not shown, driven in the same direction as that of the first carriage but at half the speed of the first carriage.

The image light reflected by the first mirror 233 is reflected by the second mirror 234 in a downward direction (z-direction). Then, the image light is reflected by the third mirror 235 in the sub-scan direction y, collected by a lens 236, and directed to a CCD 207 that converts the light into electrical signals.

The first and the second carriages are reciprocally driven back and forth in the y-direction by a carriage motor 238 serving as a driving source. That is, the first and the second carriages are driven to scan the document and then return to a home position.

The scanner 210 is a flatbed-type scanner in which the illumination lamp 232 and the first mirror 233 scan the document on the contact glass 231 so as to project the document image onto the CCD 207. However, in order to allow sheet-through reading, a reading glass 240 serving as a sheet-through reading window is disposed in a field of view of the first mirror 233 when the first carriage is at a home position (HP), or a stand-by position. The ADF 230 is mounted substantially above the reading glass 240. A conveyance drum (platen) 244 of the ADF 230 is disposed to face the glass 240.

The document placed on a document tray 241 of the ADF 230 is sent to a place between the conveyance drum 244 and a roller 245 by a pick-up roller 242 and a pair of registration rollers 243. The document is in close contact with the conveyance drum 244 passing over the reading glass 240. Subsequently, the document is discharged by the sheet eject rollers 246 and 247 onto a catch tray (base body) 248 serving also as a platen substantially below the document tray 241.

When the image on the front side of the document passes over the reading glass 240, the image is irradiated by the illumination lamp 232 moving immediately below the reading glass 240. The reflected light from the document surface is directed onto the CCD 207 through the optical system such as the first mirror 233 so that the reflected light is photoelectrically converted. In other words, the reflected light is converted to color image signals of red, green, and blue (hereinafter referred to as RGB image signals).

The surface of the conveyance drum 244 includes a white backboard facing the reading glass 240. The white backboard is used to provide a white reference surface.

The image on the back side of the document is read by an imaging device 408 including a light source and an imaging element, and photoelectrically converted. In other words, the image is converted to RGB image signals. A white backboard 409 is provided across from the imaging device 408. The document passes between the imaging device 408 and the white backboard 409.

Between the reading glass 240 and a scale 251 for alignment of the front edge of the document are provided a reference white plate 239 and a sensor 249 which detects the first carriage.

When an emission intensity of each illumination lamp 232 varies or the main scan direction varies, and/or a sensitivity of each pixel of the CCD 207 varies, read data of the document may vary, even if a density of the document is uniform. In consideration of such problem, a reference white plate 239 is provided so as to perform shading correction to correct variations in the read data.

The catch tray (platen) 248 of the ADF 230 is hinged at a base body of the scanner 210 at the back of the scanner 210. When the catch tray 248 of the ADF 230 is lifted up by holding a handle 250m, the ADF 230 can be lifted open. At the back of the catch tray 248, a switch for detecting the open-close status of the ADF 230 is disposed.

A pressure plate 250p is provided at the bottom of the ADF 230 facing the contact glass 231. When the ADF 230 is closed, the bottom surface of the pressure plate 250p comes into close contact with the upper surface of the contact glass 231.

Referring now to FIG. 4, there is provided a block diagram illustrating a system configuration for text/image information processing by the image forming apparatus 1. In FIG. 4, the scanner 210, the ADF 230, and the printer 100 are connected to an image data processor 2.

The image data processor 2 includes input image data processors 2a and 2b and an output image data processor 2c. The input image data processors 2a and 2b each perform image processing including scanner gamma correction, filtering, background density adjustment (background removal) and so forth to correct reading distortion. Furthermore, according to the exemplary embodiment, security encoding processing is also performed.

Figure 5:
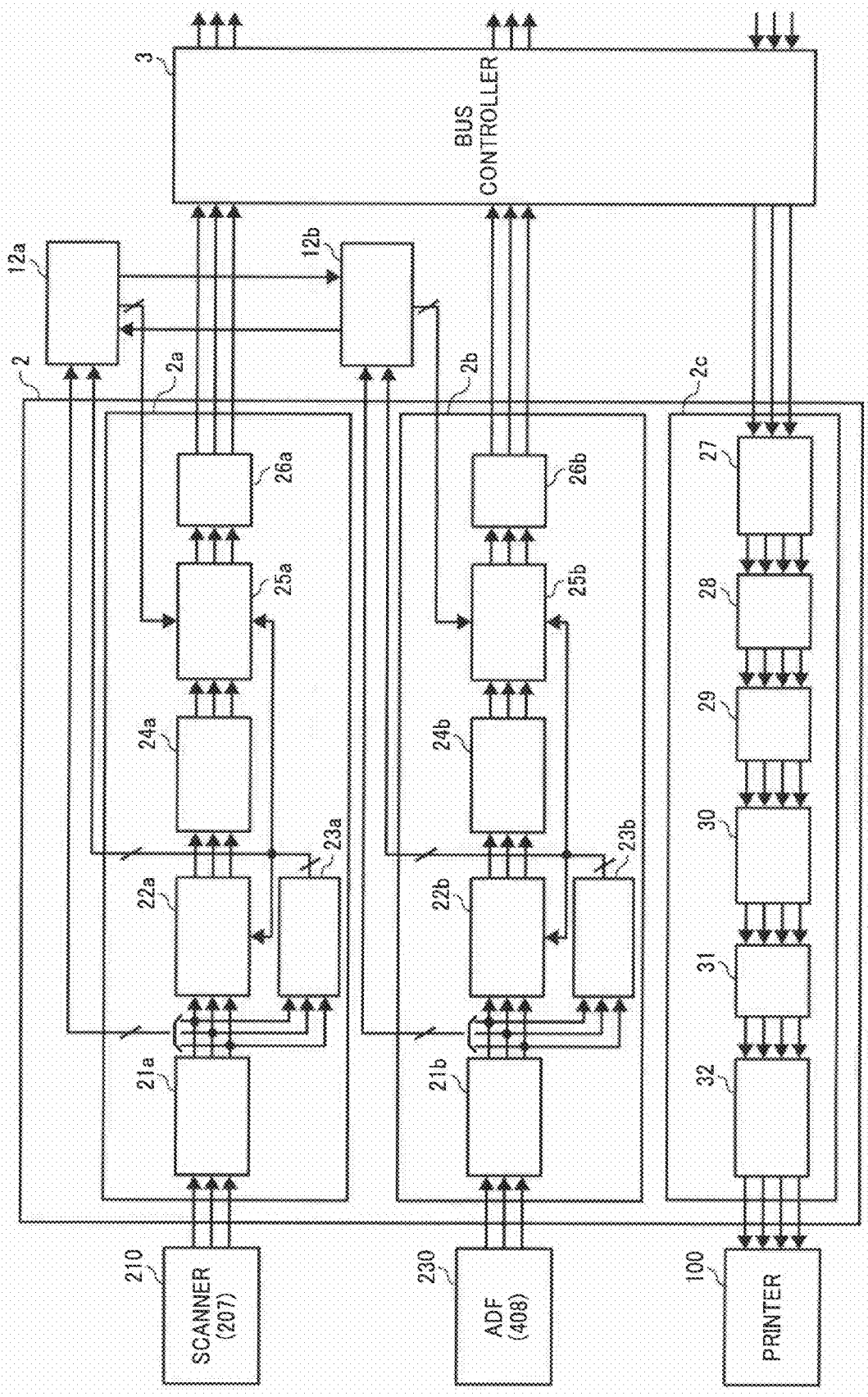
FIG. 5 is a functional block diagram illustrating an image data processor of FIG. 4, according to an exemplary embodiment of the present invention.

As shown in FIG. 5, the input image data processor 2a includes a scanner gamma correction unit 21a for performing scanner gamma correction; a filtering unit 22a for performing filtering; an image area separator 23a for detecting and separating a text area and a non-text area; a background density adjusting unit 24a for adjusting the background density; a security encoding unit 25a for performing security encoding processing; a magnification unit 26a for performing magnification; and so forth. The structure of the input image data processor 2b is similar to, if not the same as, that of the input image data processor 2a.

The output image data processor 2c includes a color correction unit 27 for performing color correction including color conversion from RGB signals to YMCK signals; a magnification unit 28 for performing magnification; an image processing unit 29 for processing an image; a printer gamma correction unit 30 for performing printer gamma correction; a gradation unit 32 for performing gradation processing, and so forth. In addition, according to the exemplary embodiment, the output image data processor 2c includes a background pattern composition unit 31 for embedding a background pattern in a background area of the image.

According to the exemplary embodiment, a background pattern detector 12a detects a background pattern (shown in FIG. 9A) of a document image of the front side of a document read by the CCD 207 of the scanner 210. A background pattern detector 12b detects a background pattern of a document image of the back side of a document read by the imaging device 408 of the ADF 230.

A bus controller 3 controls designation of data lines for transmission of image data between the image data processor 2 and a memory controller 4, and performs communication between the image data processor 2, the memory controller 4, and a CPU 5 which is a main component of the system controller. The bus controller 3 performs primary compression/expansion of the image data.

The memory controller 4 includes an access controller, a memory controlling device, a compression/expansion unit, an image editing unit, a bus controlling device, a port controller, a network controller, and so forth. The memory controlling device, the compression/expansion unit, the image editing unit, the bus controlling device, the port controller, and the network controller are each connected to the access controller via a direct memory access controller (DMAC).

In accordance with control of the CPU 5, the memory controller 4 controls, for example, a main memory 7 and an HDD 8 for accessing the image data, expansion of data for printing for a personal computer (PC) connected to LAN, secondary compression/expansion of the image data so as to effectively use the main memory 7 and the HDD 8, and transfer of image data to the PC, a memory card, and the like.

The memory controller 4 secondarily compresses the image data (primary compressed data) sent from the bus controller 3 and then stores the image data in the main memory 7 or the HDD 8. The stored image data is read out as necessary. The read-out image data is expanded (secondary expansion) so as to be recovered to the primary compressed data which is then returned to the bus controller 3 from the memory controller 4. Subsequently, the bus controller 3 primarily expands the primary compressed data to the original image data. The original image data is output to the printer 100 via the image data processor 2.

Furthermore, the memory controller 4 includes a general-purpose or commercial decompression/compression function which decompresses (expands) the compressed data read from a facsimile, PC, or a recording medium such as a memory card. Frame-sequential image data, line-sequential image data, or dot-sequential image data generated in the printer can be compressed. When the image data is transferred to the external facsimile, the PC, the memory card, and so forth through an external input/output controller 9 and a network interface (I/F) 10 such as Ether, wireless network, USB, and IEEE or a media interface (I/F) 11 such as an SD card, a USB memory and a CD-ROM, the image data is compressed by the compression function.

The memory controller 4 further includes a primary compression/decompression function. The secondary expansion function expands the secondary compressed data in the memory 7 to the primary compressed data. The primary expansion function expands the primary compressed data to the image data so as to expand the image data in the memory 7.

The CPU 5 controls reading and writing of data including a program, control data, reference data, a conversion table (Look Up Table (LUT)) and so forth, other than the text/image data. The CPU 5 controls operation of each component.

The operation board 6 instructs processing to be performed by the CPU 5 according to input by a user. For example, types of processing (copying, fax transmission, image reading, printing, and so forth) are input. According to the operation by the user relative to the operation board 6, the operation board 6 reads the user operation and controls output on the display. For example, the operation board 6 reads a numeric keypad depressed by the user, generates input numeric data, reads a start key depressed, instructs copy start, transfers the instruction of copy start to the CPU 5, reads input associated with a change in the sheet size, and so forth. Accordingly, information for the control of the image data can be input.

The network control by the memory controller 4 includes controlling the connection of LAN and the Internet. The network control manages transmission and reception of data relative to external extended devices connected to the network. In other words, a file and/or an e-mail transmitted and received via LAN or the Internet is transmitted and received through the external input/output controller 9 based on a WWW server stored (setup) in the HDD 8, an FTP server, an SMTP server, a DHCP server, and other servers used for transmission and receipt of a file and/or an e-mail. The network control generates a transmission file and adds a receiving file to a directory.

The CPU 5 controls the network interface in the memory controller 4. For example, in accordance with a document reading command and a transmission command from the operation board 6 or a PC 1, the CPU 5 instructs the memory controller 4 to generate the transmission file and a directory of a designation of transmission, and to transmit the transmission file.

The access control function performs command control by the CPU 5, and moreover manages access to the memory 7 and the HDD 8 from external devices.

The image data output by the scanner 210 is transferred to the memory controller 4 through the image data processor 2 and is written to the memory controller 4. The management of the memory access of the loaded image data is no longer performed by the CPU 5. Namely, the memory access is performed by the DMAC independently of the system control. The access control function mediates requests for access to the memory 7 and the HDD 8 from a plurality of units. The access control function controls access to the memory 7 and the HDD 8, or reading/writing data.

When accessing the memory 7 and the HDD 8 from the network, the data written to the memory controller 4 from the network by the network control function is transferred to the memory 7 and the HDD 8 by the DMAC. The access control function mediates requests for access to the memory 7 and the HDD 8 among a plurality of jobs. The memory control function of the memory controller 4 reads and writes the data to and from the memory 7 and the HDD 8.

When accessing the memory 7 and the HDD 8 from a serial bus, the data written to the memory controller 4 through the port by the port control function is transferred to the memory 7 and the HDD 8 by the DMAC. The print output data from the PC connected indirectly through the network or connected directly is converted to image data using font data, and expanded in a memory area in the memory 7 and the HDD 8.

The CPU 5 manages the interface of each external device. With respect to data transfer after the data is written to the memory controller 4, each DMAC manages memory access. In this case, each DMAC independently executes data transfer. Therefore, the access control function sets job collision and access request priority associated with memory 7 and the HDD 8 access.

Referring now to FIG. 5, there is provided a functional block diagram illustrating the image processing function of the image data processor 2.

As described above, the image data processor 2 includes the input image data processors 2a and 2b, and the output image data processor 2c. The input image data processors 2a and 2b each perform reading correction to enhance the image quality of read image data (R, G, B data) output by the scanner 210 and the ADF 230, and also perform the security encoding processing. The output image data processor 2c converts the read image data to recording image data so as to correspond to image representation characteristics of the printer 100. Furthermore, the output image data processor 2c performs correction to enhance image forming quality, and add security information.

The input image data processor 2a includes the scanner gamma correction unit 21a, the image area separator 23a, the filtering unit 22a, the background density adjusting unit 24a, the security encoding unit 25a, and the magnification unit 26a. The scanner gamma correction unit 21a calibrates or adjusts gradation characteristics of the image data. The image area separator 23a determines whether each portion in an image is a text area or a picture area. Namely, the image area separator 23a detects image characteristics and extracts the image area. The filtering unit 22a sharpens or smoothens the image in accordance with the image characteristics of the text area or the picture area, based on the determination made by the image area separator 23a.

Similar to the area division disclosed in Japanese Patent No. 3278471, the image area separator 23a detects the text area and the non-text area. When the area is recognized as neither the text area nor the non-text area, the area is identified as a background area.

In accordance with a security code (security encoding instruction data) generated by the background pattern detector 12*a*, the security encoding unit 25*a* applies specific image damaging processing to an image characteristic area being identified. When the background pattern detector 12*a* does not detect the security information such as that illustrated in FIG. 9A, the security encoding processing 25*a* does not damage the image. That is, the original image data output by the background density adjustment unit 24*a* is output to the magnification unit 26*a* as is.

The functional structure of the input image data processor 2*b* is similar to, if not the same as, that of the above-described input image data processor 2*a*. The function of the background pattern detector 12*b* is similar to, if not the same as, that of the background pattern detector 12*a*.

Figure 6:
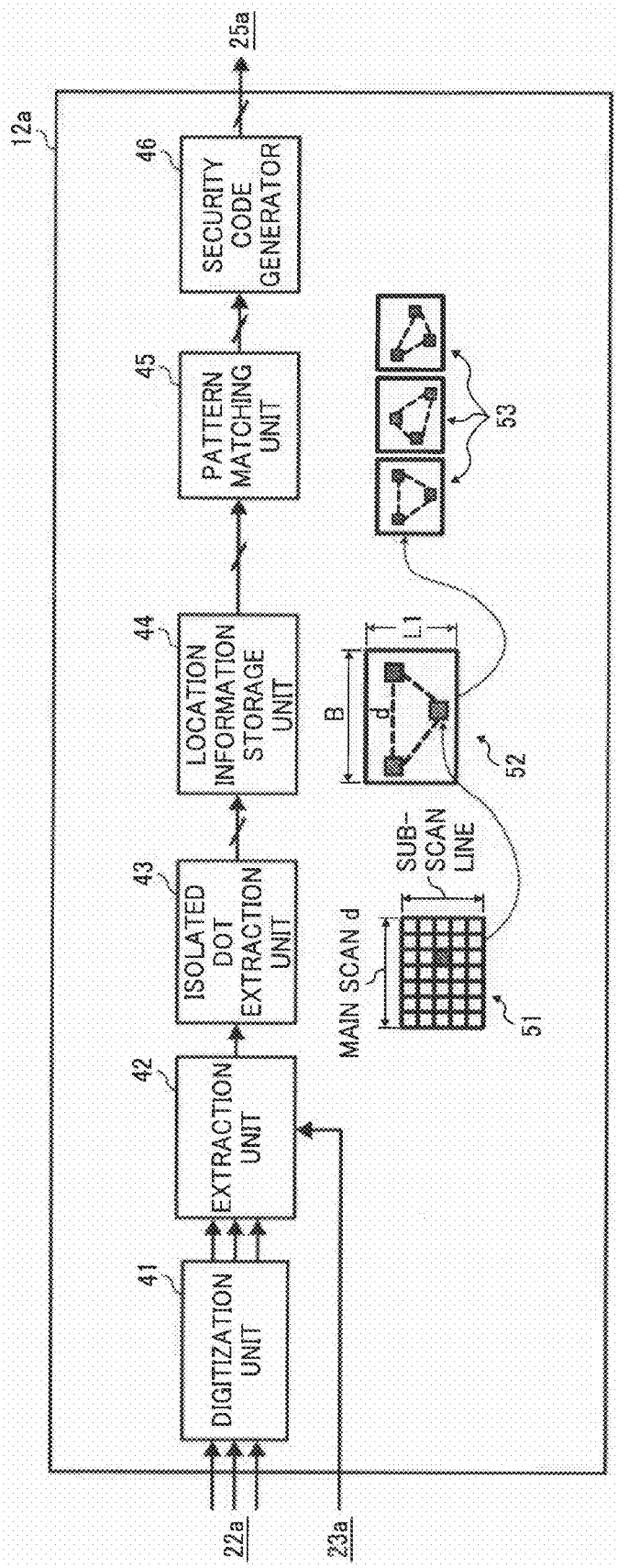
FIG. 6 is a block diagram illustrating a background pattern detection process performed by a background pattern detection processor of FIG. 4, according to an exemplary embodiment of the present invention.

Referring now to FIG. 6, there is provided a block diagram illustrating functions of the background pattern detector 12*a*. The background pattern detector 12*a* includes a digitization unit 41, an extraction unit 42, an isolated dot extraction unit 43, a location information storage unit 44, a pattern matching unit 45, and a security code generator 46.

The digitization unit 41 of the background pattern detector 12*a* digitizes the RGB image data output by the scanner gamma correction unit 21*a*. An image in black color in the background area is extracted from the digital RGB image data in the extraction unit 42.

Subsequently, in the isolated dot extraction unit 43, an isolated pixel in the black color image is detected from an area 51 expressed by d×l, where d is a number of main-scan pixels and l is a number of sub-scan lines. Based on the isolated pixel in the area d×l, the location information storage unit 44 stores a location relation of the isolated pixel in a block Bd×Ll, where B is a number of b, and L is a number of l (refer to 52 in FIG. 6.)

Subsequently, in the pattern matching unit 45, the location relation information of the isolated pixel in the block Bd×Ll stored in the location information storage unit 44 is matched with the location relation information (reference information) of various reference patterns in a first group prestored in the location information storage unit 44 (refer to 53 in FIG. 6.) Accordingly, a corresponding reference pattern is searched.

When the corresponding reference pattern is found, the security code generator 46 generates the security code (the security encoding instruction data such as that illustrated in FIG. 9B) using bit data designated to the reference pattern. Subsequently, the security code is provided to the security encoding unit 25*a*.

The functions of the background pattern detector 12*b* are similar to, if not the same as, that of the background pattern detector 12*a*. However, the background pattern detector 12*b* uses reference patterns (reference information) of a second group for pattern matching.

The photoelectric conversion characteristics of the image sensor of the CCD 207 of the scanner 210 and the imaging device 408 of the ADF 230 are different. Thus, the image representation of the image data on the front side output by the scanner 210 and the image representation of the image data on the back side output by the ADF 230 vary.

In view of the above, the HDD 8 stores the location relation information (the first reference information) of the reference patterns of the first group for accurately detecting the security information (the background pattern dot illustrated in FIG. 9A) of the front side image data output by the scanner 210. The HDD 8 also stores the location relation information (the second reference information) of the reference patterns of the second group for accurately detecting the security information of the back side image data output by the ADF 230.

When the main power of the image forming apparatus 1 is turned on, operating voltage is supplied to each component which is then initialized. Immediately after initialization of the components, the CPU 5 writes the first reference information stored in the HDD 8 to the memory (register) of the location information storage unit 44 in the background pattern detector 12*a*, and writes the second reference information stored in the HDD 8 to the register of the location information storage in the background pattern detector 12*b*.

The pattern matching unit 45 downstream of the location information storage unit 44 uses the reference information in the location information storage unit 44 as the reference information for pattern matching.

Referring now to FIG. 7, there is provided a flowchart showing an exemplary procedure of a copy operation.

When copying, a liquid crystal display (LCD) of the operation board 6 or a display of a PC when using a PC displays a copy input screen showing a password input screen, requesting an operator to enter a password in step S1. In response, the operator may insert an IC card into a user authentication device or input the password manually via the operation board 6. When the input password is verified as a registered password in step S2 and step S3, the CPU 5 reads information input by the operator through the copy input screen in step S4, and sets copy conditions associated with the input information.

The operator may then place a document on the ADF 230 (or a contact glass 231), set a desired copy mode and so forth, and instruct copy start by pressing a start key on the operation board 6 (or the PC) in step S5. Before instructing copy start, the operator may assign "ADD SECURITY INFORMATION". A description of the copy operation using a PC is omitted.

When the start key is pressed, that is, when the operator instructs copy start, the operation board 6 converts the information input by the operator to control command data for the internal devices. The control command is issued and reported to the CPU 5.

In accordance with the control command data of copy start, the CPU 5 executes a program for the copy operation so as to set settings and operations necessary for the copy operation. A description of an exemplary procedure of the copy operation is provided below.

First, when "ADD SECURITY INFORMATION" is entered in the operation board 6 before copy start is instructed, the operation board 6 displays, on the LCD, an information input table which shows security settings including, SUBJECT AREA, PATTERN, COLOR, and WARNING TEXT, for example, and the contents thereof to be selected so as to form the security code, as illustrated in FIG. 9B. Accordingly, the operator is requested to select an appropriate content from each security setting to create a security code.

A default for each security setting is set to 3 (NON-TEXT AREA & TEXT AREA, PAINT, BLUE, and COPY PROHIBITED). However, the default content can be changed in the initial setting.

When the operator changes or does not change the selected content, and the operator enters "OK" or "ENTER", the CPU 5 generates the security code indicating the contents of the information in the information input table, as copy start is instructed.

Subsequently, the CPU 5 reads out each image data representing black dot patterns from the HDD 8 to the memory 7. As illustrated in FIG. 9A, the CPU 5 divides the sequence of the security code consisting of (a) through (h) into two parallel lines. Subsequently, the image data representing a dot pattern group Ac, that is, a background pattern image including a plurality of dot pattern sequences Ad, is expanded in the memory 7, and is written in the internal memory of the background pattern composition unit 31 (steps S6 and S7). As illustrated in FIG. 9A, the background pattern image is the dot pattern group Ac in which a first dot pattern is designated at a position of each bit "0", and a second dot pattern is designated at a position of each bit "1".

Next, document reading is initiated. The CCD 207 reads the document image on the front side, and converts to 8-bit digital image data for each of RGB, the shading of which is corrected. The imaging device 408 reads and converts the document image on the back side to 8-bit digital image data for each of RGB, the shading of which is corrected. Reading distortion of the digital image data of the front side of the document and the digital image data of the back side of the document is corrected by the input image data processors 2a and 2b of the image data processor 2. In other words, the characteristics of the digital image data of the front side and the back side of the document are unified to the predetermined characteristics, and the background pattern is detected by the background pattern detectors 12a and 12b in steps S8 and S9. That is, the background pattern detection illustrated in FIG. 6 is performed.

Subsequently, when no security information is detected from both the front side image and the back side image in step S10, the original image data output by the background density adjusting units 24a and 24b is stored in the main memory 7 in step S12.

When the security information is detected from both the front side image and the back side image, the security encoding units 25a and 25b apply the appropriate damaging processing associated with the security information of the front side image and the back side image to both the front side image and the back side image in step S11a, and subsequently the front side image and the back side image are stored as a first image data and a second image data in the main memory 7, respectively, in step S12.

When the security information is detected from either the front side image or the back side image, the security encoding units 25a and 25b apply the same damaging processing associated with the image containing the security information to both the front side image and the back side image in step S11b. Subsequently, the front side image and the back side image are stored as the first image data and the second image data in the main memory 7 in step S12.

Figure 8A:
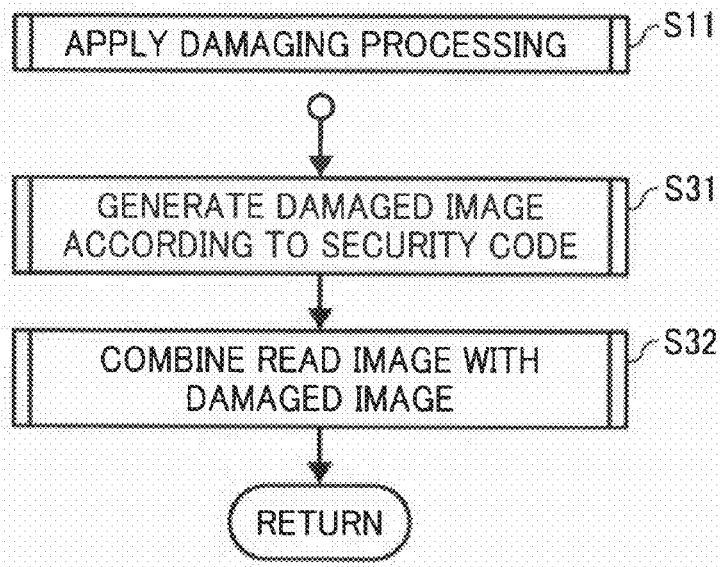
FIG. 8A is a flowchart illustrating an exemplary security encoding procedure performed in step S11 of FIG. 4, according to an exemplary embodiment of the present invention.

Referring now to FIG. 8A, there is provided an exemplary procedure of the security encoding processing (damaging processing) of steps S11a and S11b. In FIG. 8A, a damaged image, to which the damaging processing specified by the security code such as shown in FIG. 9B is applied, is generated in the background area (background pattern area), the text area, the non-text area, or both the text area and the non-text area recognized by the image area separators 23a and 23b.

For example, when the security setting of "SUBJECT AREA" of the security code is "3: NON-TEXT & TEXT AREA", "PATTERN" is "3: MATT", "COLOR" is "3: BLUE", and "WARNING TEXT" is "3: COPY PROHIBITED", a damaged image is formed such that the non-text and the text areas of the image stored in the main memory 7 is painted in blue, and furthermore, "COPY PROHIBITED" in outline characters is written in the non-text and the text areas in step S31.

In step S32, the security encoding units 25a and 25b convert the image data in the non-text area or the text area to the damaged image data. Accordingly, the image data to be stored in the main memory 7 is an image in which the non-text and the text areas thereof are converted to the damaged image.

Subsequently, when the original image data or the image data subjected to damaging processing is stored in the main memory 7, the CPU 5 reads out the image data of the front side image from the main memory 7 and outputs the front side image data to the output image data processor 2c of the image data processor 2. When the image data of the back side image is also stored in the main memory 7, the CPU 5 subsequently reads out the back side image data and outputs the image data to the output image data processor 2c in step S13.

Upon reading out the image data from the main memory 7 in a manner described above, when there is the instruction indicating "ADD SECURITY INFORMATION" in step S14, the background pattern composition unit 31 embeds the background pattern image in the image to read in step S15. In step S16, the composite image with the embedded background pattern image is printed out as a copy image.

Figure 8B:
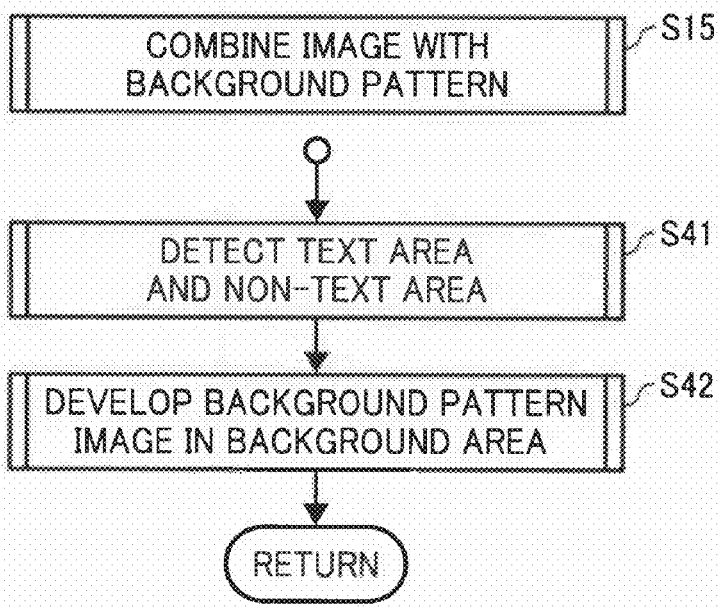
FIG. 8B is a flowchart illustrating an exemplary background pattern composition procedure performed in step S15 of FIG. 4, according to an exemplary embodiment of the present invention.

Referring now to FIG. 8B, there is provided an exemplary procedure of the background pattern composition of step S15. When the CPU 5 instructs "ADD SECURITY INFORMATION", the background pattern composition unit 31 of the output image data processor 2c detects the text area and the non-text area in a similar manner as that disclosed in the Japanese Patent No. 3278471 in step S41, and converts the image data of the background area, that is, the area other than the text area and the non-text area, to the image data representing the background pattern image as illustrated in FIG. 9A. The same process is repeatedly performed on the background area. In other words, the background pattern image illustrated in FIG. 9A is repeatedly developed in the background area in step S42.

Referring back to FIG. 7, in step S16, the printer 100 prints out the image in which the background pattern is embedded. In other words, the image printed out by the printer is the image in which the security information is embedded.

The image forming apparatus 1 is equipped with various types of output mechanisms such as a copier, a scanner, a printer, a facsimile, a document box, and so forth. However, operations of such mechanisms are similar if not identical, except for the specific output mechanism. Thus, a description has been given of a copying operation as a representative example.

In a case of the scanner, in step S1, a scanner input screen is displayed, instead of the copy input screen, and the subsequent steps S2 through S12 are executed, accordingly.

In a case of the printer, a print image is read or developed in the main memory 7 in step S4, and the subsequent steps S5 through S16 are executed, accordingly.

In a case of the facsimile, steps from password verification in step S2 through reading out the image from the main memory 7 in step S13 are executed.

In a case of the document box, with respect to the image registration, steps S4 through S12 are executed. Printing of the registered image is similar to, if not the same as printing by the printer. Image transfer is performed in a similar if not the same manner as that of the facsimile.

Exemplary Embodiment 2

Figure 10:
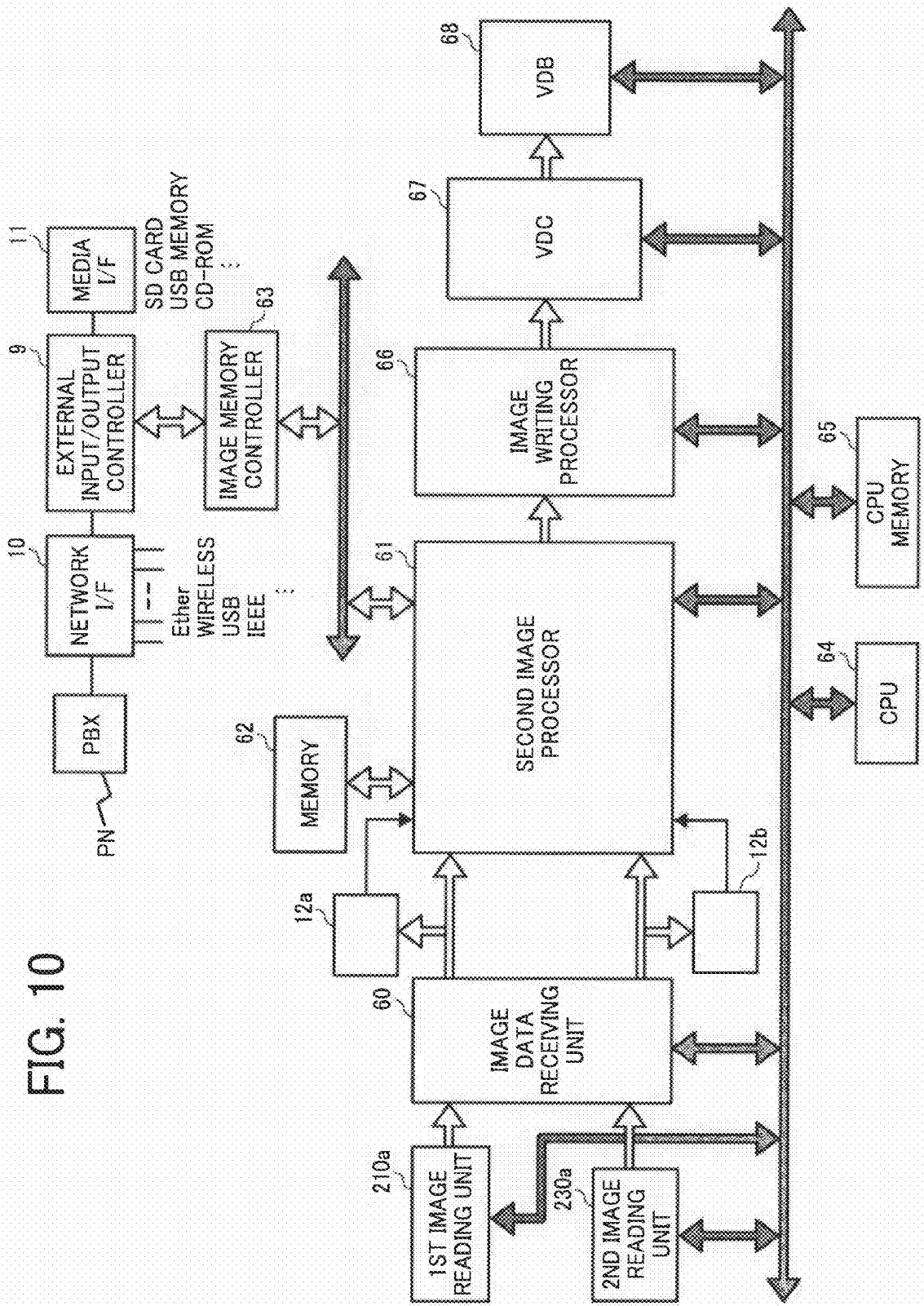
FIG. 10 is a block diagram illustrating a text/image information processing system, according to another exemplary embodiment of the present invention.

Referring now to FIG. 10, there is provided a block diagram illustrating a system configuration of the text/image information processing of the image forming apparatus 1, according to another exemplary embodiment (exemplary embodiment 2).

A first image reading unit 210a and a second image reading unit 230a each generate image data through scanning a document, and correspond to the scanner 210 and the ADF 230 of the exemplary embodiment 1.

The each image data generated by the first image reading unit 210*a* and the second image reading unit 230*a* is input in a image data receiving unit 60. Based on the characteristics of each of the received image data, the image data receiving unit 60 performs scanner processing including shading correction, background density adjustment, and so forth on each image data. The shading correction corrects variations in the image density due to distortion of the optical distribution. The background density adjustment unit adjusts the density of the background in accordance with the document background.

At the next level, each image data after the scanner processing is input in a second image processor 61 including a memory controller. The second image processor 61 stores the received image data in a memory 62 per frame. The image data stored per frame is retrieved per frame from the image data read by the first image reading unit 210*a*, for example, and sent to the second image processor 61 which then performs various image processing. Subsequently, the image data after the image processing is sent to an image memory controller 63 via a bus.

The image memory controller 63 includes a storage, not shown, to accommodate large amount of image data. The image memory controller 63 stores image data in the storage so as to receive a subsequent input image, or sends image data stored in the storage to the second image processor 61 for producing hardcopy. Accordingly, the image memory controller 63 stores image data in the storage and controls retrieval of image data from the storage.

According to the exemplary embodiment, the image data from the first image reading unit 210*a* is stored in the memory 62, and processed first. Thus, the subsequent image data to be processed is image data from the second image reading unit 230*a*. The image data from the second image reading unit 230*a* is processed in a manner similar to the above-described manner. Upon request, the data is retrieved from the storage and sent to the second image processor 61.

After receiving the image data from the image memory controller 63, the second image processor 61 sends the image data to an image writing processor 66. The image writing processor 66 performs appropriate image processing such as gradation processing in order to produce hardcopy in the printer and sends the image data to a VDC 67 of the printer.

In the VDC 67, pre-processing is performed on the image data so that the image data is modified to an image format which can be processed in a VDB 68 of the next stage, for example. Subsequently, the image data is sent to the VDB 68.

In the VDB 68, the image writing processing is performed on the received image data using irradiation of the laser diode of the laser exposure device of the printer, and other processing. The image is transferred onto a recording sheet through subsequent transfer processing of the printer, thereby obtaining hardcopy.

The background pattern detectors 12*a* and 12*b* having the similar if not the same function as that of the exemplary embodiment 1 detect the background pattern of the image data from the first image reading unit 210*a* and from the second image reading unit 230*a*. The detection result of the background pattern is output to the second image processor 61 at the next stage.

The second image processor 61 includes the security encoding units similar to, if not the same as the security encoding units 25*a* and 25*b*, and the magnification units similar to, if not the same as the magnification units 26*a* and 26*b* of the exemplary embodiment 1.

The second image processor 61 according to the exemplary embodiment 2 includes the similar if not the same output image data processor 2*c* of the exemplary embodiment 1 equipped with the color correction unit for performing color correction, the magnification unit for performing magnification, the image processing unit for processing an image, the printer gamma correction unit for performing printer gamma correction, the background pattern composition unit for performing background pattern composition processing, and so forth. In response to the background pattern detection by the background pattern detectors 12*a* and 12*b*, each security encoding unit performs the security encoding processing to each image data.

Each image data to which the security encoding processing is performed is temporarily stored in the memory 62. Subsequently, the second image processor 61 performs the output image data processing upon request. According to this structure, it is possible to reflect the detection result of the background pattern on the image data stored in the memory 62.

The image memory controller 63 corresponds to the memory controller 4 of the exemplary embodiment 1. The second image processor 61 is connected to the image memory controller 63 using the bus in both directions. The image data processed by the second image processor 61 is output to the image writing processor 66 and can be stored in the storage of the image memory controller 63. The image data stored in the storage can be output from the image memory controller 63 to the second image processor 61. Furthermore, the image data stored in the storage can be output to the external devices such as the network I/F 10 and the media I/F 11 via the external input/output controller 9.

A CPU 64 communicates with the CPU 5 and controls the first and the second image reading units 210*a* and 230*a*, the image data receiving unit 60, the second image processor 61, and the VDC 67. A CPU memory 65 is a program memory which enables the CPU 64 to operate.

Exemplary Embodiment 3

Figure 11:
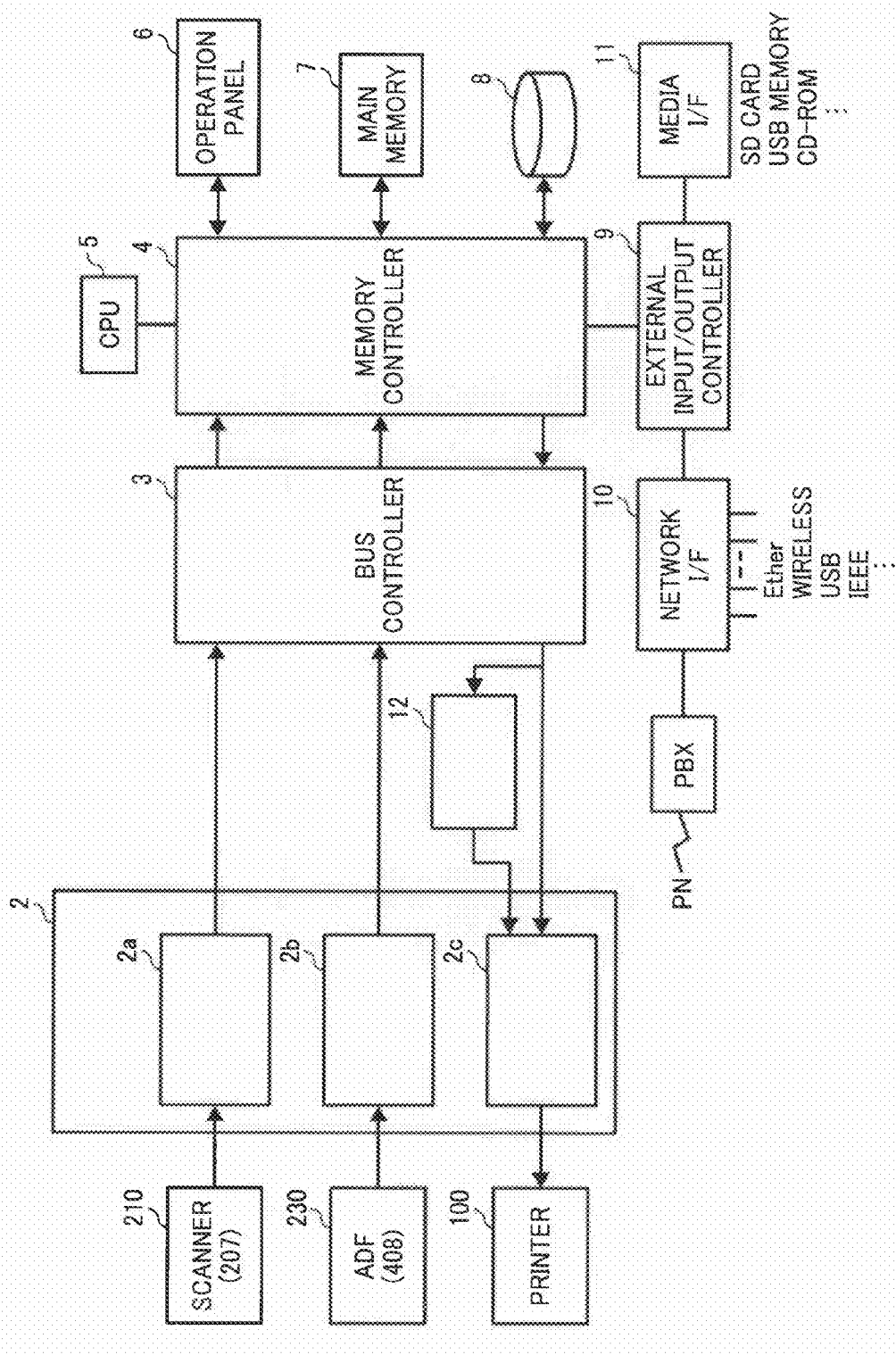
FIG. 11 is a block diagram illustrating a text/image information processing system, according to still another exemplary embodiment of the present invention.

Referring now to FIG. 11, there is provided a block diagram illustrating a text/image information processing of the image forming apparatus 1, according to still another exemplary embodiment (exemplary embodiment 3). The structure of the image forming apparatus 1 according to the exemplary embodiment 3 is similar to, if not the same as the structure illustrated in FIGS. 1 through 3 of the exemplary embodiment 1.

In the text/image information processing system according to the exemplary embodiment 3 illustrated in FIG. 11, the image data of the front side image read by the scanner 210 and the image data of the back side image read by the ADF 230 are stored in the main memory 7 without being subjected to the security encoding processing.

When the image data of the front side image is read out from the main memory 7 and output to the output image data processor 2*c*, the security information of the image data of the front side image is detected using the first reference information. Based on the detected security information, the security encoding processing is performed on the image data in the output image data processor 2*c*. Subsequently, the image data is output to the printer 100.

Subsequently, when the image data of the back side image is read out from the main memory 7 and output to the output image data processor 2*c*, the security information of the image data of the back side image is detected using the second reference information. Based on the detected security information, the security encoding processing is performed on the image data in the output image data processor 2*c*. Subsequently, the image data is output to the printer 100.

Figure 12:
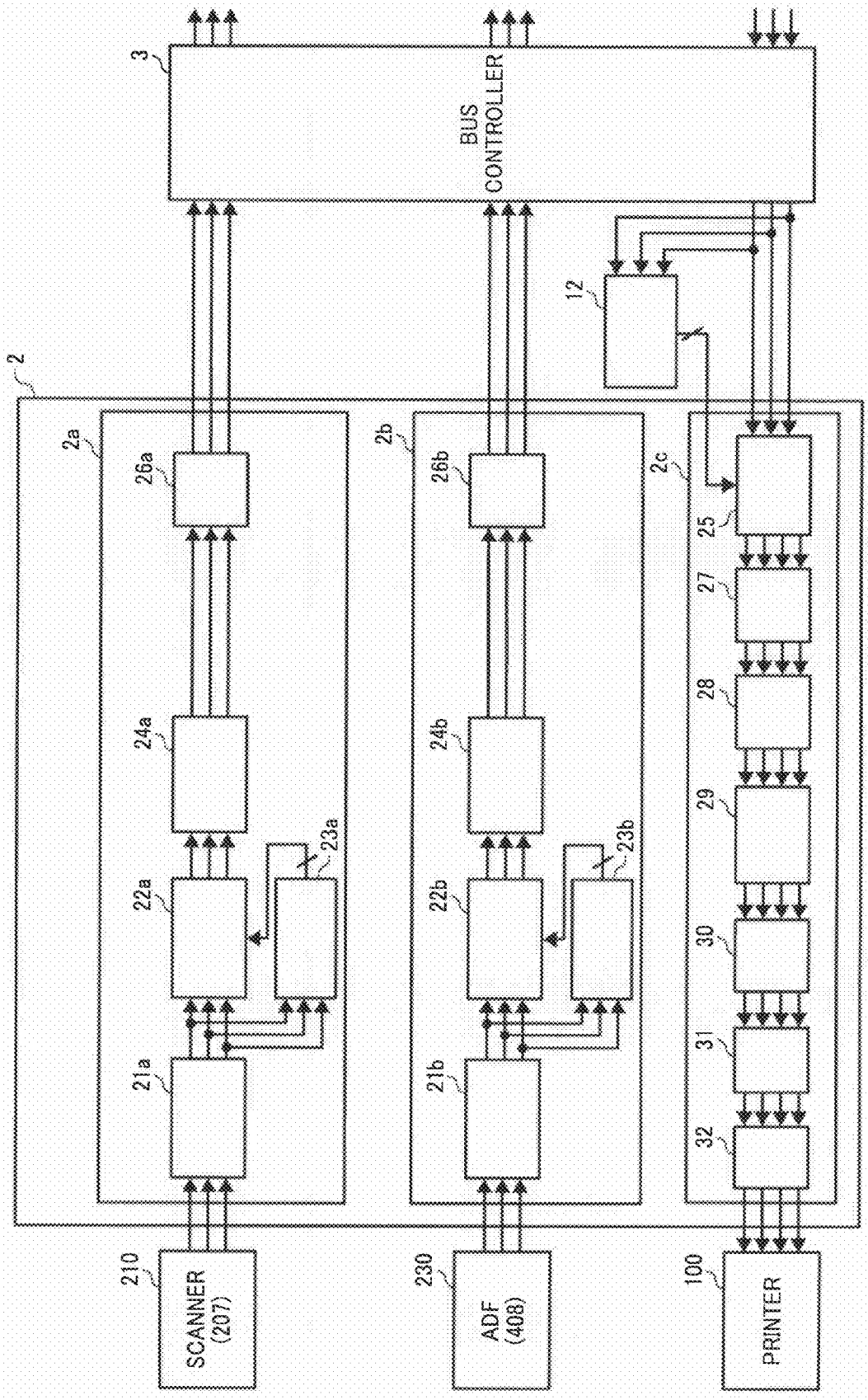
FIG. 12 is a block diagram illustrating an image data processor of FIG. 11, according to an exemplary embodiment of the present invention.

Referring now to FIG. 12, there is provided a block diagram illustrating the image data processor 2 according to the exemplary embodiment 3. As illustrated in FIG. 12, the input image data processors 2a and 2b do not include the security encoding unit to perform security encoding processing.

According to the exemplary embodiment, the single background pattern detector 12 detects the security information of the image data which is read from the main memory 7 and output to the output image data processor 2c. Namely, the security information of both the front side image and the back side image is detected by the background pattern detector 12 provided at one location.

Figure 13:
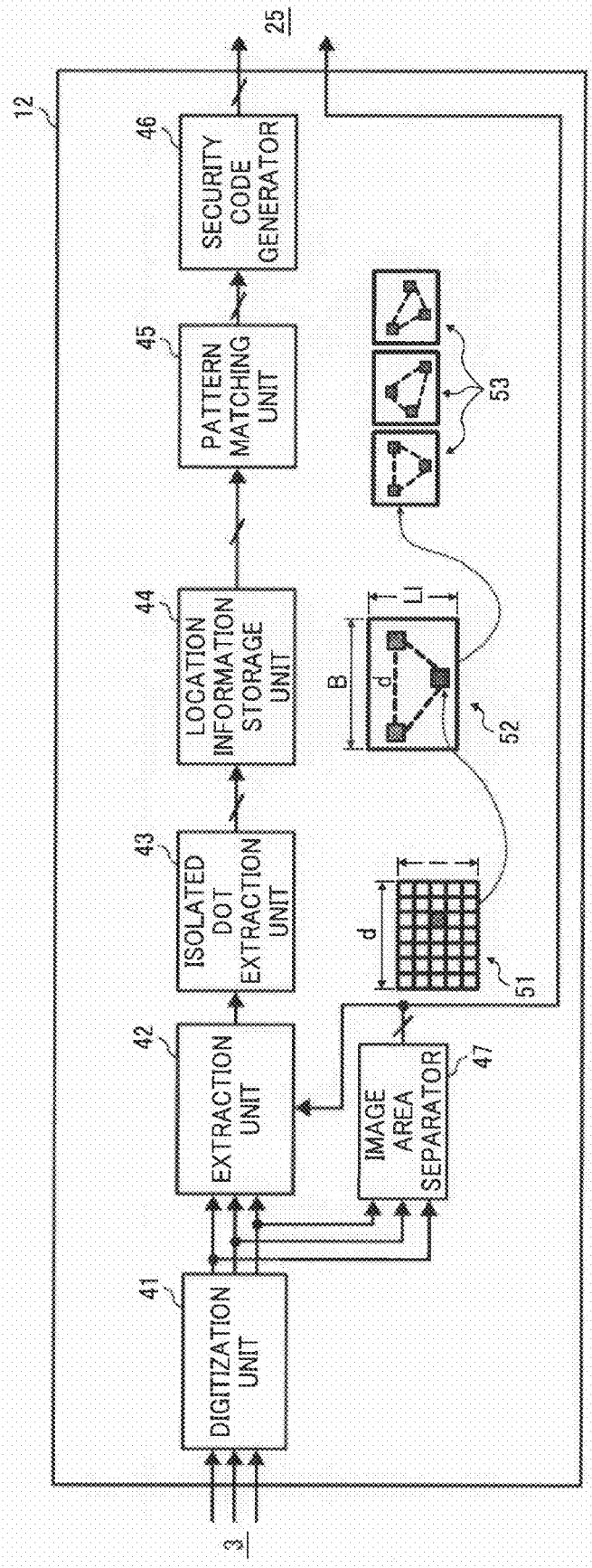
FIG. 13 is a functional block diagram illustrating background detection processing performed by a background pattern detection processor of FIG. 12, according to an exemplary embodiment of the present invention.

Referring now to FIG. 13, there is provided a block diagram illustrating functions of the background pattern detector 12. An image area separator 47 is added to the background pattern detector 12 according to the exemplary embodiment 3. Similar to the area division disclosed in Japanese Patent No. 3278471, the image area separator 47 detects the text area and the non-text area. When the area is recognized as neither the text area nor the non-text area, the area is detected as a background area, and the image area separator 47 provides the area division data to the extraction unit 42 which extracts an image in black in the background area. The image area separator 47 also provides the area division data to the security encoding unit 25 after adjusting timing to correspond to the flow of image data.

As illustrated in FIG. 12, the security encoding unit 25 is added to the output image data processor 2c so that the security encoding processing is performed on the image data input to the output image data processor 2c.

Referring now to FIG. 14, there is provided a flowchart illustrating an exemplary procedure of a copy control performed by the CPU 5 according to the exemplary embodiment 3. According to the exemplary embodiment 3, steps S1 through S7 in which the front side image and the back side image are read by the scanner 210 and the ADF 230, respectively, are similar to, if not the same as the exemplary procedure of the exemplary embodiment 1.

According to the exemplary embodiment 3, the read image data is stored in the main memory 7 without being subjected to the security encoding processing in step S8 and step S12.

When the image data is read out from the main memory 7 in step S13, the CPU 5 first installs the first reference information stored in the HDD 8 in the location information storage unit 44 of the background pattern detector 12. Subsequently, the CPU 5 reads out the image data of the front side image from the main memory 7 and outputs the image data to the output image data processor 2c. When the background pattern detector 12 detects the security information and generates the security code, the security encoding unit 25 stores the security code in the register in the security encoding unit 25 and performs, similar to the exemplary embodiment 1, the security encoding processing, that is, damaging processing associated with the security code is performed in steps (steps S13, S9, S10 and S11a.)

When read-out of the front side image is completed and the image data of the back side image is stored in the main memory 7, the CPU 5 installs the second reference information stored in the HDD 8 in the location information storage unit 44 of the background pattern detector 12.

Subsequently, the CPU 5 reads out the image data of the back side image from the main memory 7 and outputs the image data to the output image data processor 2c.

When the background pattern detector 12 detects the security information and generates the security code, the security encoding unit 25 stores the security code in the register of the security encoding unit 25 and performs the security encoding processing including image damaging processing associated with the security code (steps S13, S9, S10 and S11a).

When the image data of the back side image in a predetermined front area is read, but no background pattern is detected, the security encoding unit 25 executes the security encoding processing associated with the security code of the front side image stored in the register, accordingly (steps S10, S11b, and S11c.)

When adding the security information is instructed, the image data processing is similar to, if not the same as that of the exemplary embodiment 1.

According to the exemplary embodiment 3, the image data of the front side and the back side images are generated using the two different reading units, that is, the CCD 207 and the imaging device 408, respectively, and sequentially output on the same path. The security information of the each image data is detected.

However, the reading characteristics of the reading units 210a and 230a differ. Thus, the reference information for the pattern detection is switched to the reference information that is more compatible to each image. In other words, upon detection of the security information of the front side image, the first reference information is used. Upon detection of the security information of the back side image, the second reference information is used. Accordingly, it is made possible to reduce a number of hardware designated for detection of the security information and security encoding processing.

Exemplary Embodiment 4

Referring now to FIG. 15, there is provided a block diagram illustrating a text/image information processing of the image forming apparatus 1, according to still another exemplary embodiment (exemplary embodiment 4). The first reading unit 210a and the second reading unit 230a scan a document and generate image data. The first reading unit 210a and the second reading unit 230a correspond to the scanner 210 and the ADF 230 of the exemplary embodiment 1.

The image data generated by each of the reading units 210a and 230a is input in the image data receiving unit 60. Based on the characteristics of each of the received image data, the image data receiving unit 60 performs scanner processing including shading correction, background density adjustment, and so forth on each image data. The shading correction corrects variations in the image density due to distortion in the optical distribution. The background density adjustment adjusts the density of the background in accordance with the document background.

Each image data after the scanner processing is input in a memory controller 61a of the next stage. The memory controller 61a stores the received image data in the memory 62 per frame. The image data stored per frame is retrieved per frame from the image data read by the first reading unit 210a, for example, and sent to a second image processor 61b.

The second image processor 61b includes, the similar if not the same background pattern detector 12 of the exemplary embodiment 3, and the output image data processor of the exemplary embodiment 3 including the security encoding unit 25, the color correction unit for performing color correction, the magnification unit for performing magnification, the image processing unit for processing an image, the printer gamma correction unit for performing printer gamma correction, and the background pattern composition unit for performing background pattern composition processing.

After performing the security encoding processing and the magnification, or after further performing the output image data processing, the second image processor 61b sends the image data to the image memory controller 63 via the bus.

The image memory controller 63 includes a storage, not shown, to accommodate large amount of image data. The image memory controller 63 stores the image data in the storage so as to receive a subsequent input image, or sends the image data stored in the storage to the second image processor 61b for producing hardcopy. Accordingly, the image memory controller 63 stores image data in the storage and controls retrieval of the image data from the storage.

According to the exemplary embodiment, the image data from the first reading unit 210a is processed first. Thus, the subsequent image data to be processed is image data from the second reading unit 230a. The image data from the second reading unit 230a is processed in a manner similar to the above-described manner. Upon request, the data is retrieved from the storage and sent to the second image processor 61b.

After receiving the image data from the image memory controller 63, the second image processor 61b sends the image data to the image writing processor 66 at the next stage. The image writing processor 66 performs appropriate image processing such as gradation processing in order to produce hardcopy and sends the image data to the VDC 67 of the printer.

In the VDC 67, pre-processing is performed on the image data so that the image data is modified to an image format which can be processed in the VDB 68 of the next stage, for example. Subsequently, the image data is sent to the VDB 68.

In the VDB 68, the image writing processing is performed on the received image data using irradiation of the laser diode of the laser exposure device of the printer and other suitable processing. The image is transferred onto a recording sheet through subsequent transfer processing of the printer, thereby obtaining hardcopy.

As illustrated in FIG. 15, the background pattern detector 12 between the memory controller 61a and the second image processor 61b detects the background pattern of the image data. The detection result of the background pattern is output to the second image processor 61b. The second image processor 61b performs on the image data the security encoding processing associated with the detection result of the background pattern.

The different read image data from the reading unit 210a and the reading unit 230a are sequentially output on the same path, and the background pattern detection is performed on each read image data. Depending on the reading characteristics of the reading units 210a and 230a, the settings of the background pattern detection are changed according to each read image. Accordingly, it is made possible to reduce a number of hardware designated for detection of the background pattern.

The image memory controller 63 corresponds to the memory controller 4 of the exemplary embodiment 3. The second image processor 61b is connected to the image memory controller 63 using the bus in both directions. The image data processed by the second image processor 61b is output to the image writing processor 66 and can be stored in the storage of the image memory controller 63.

The image data stored in the storage can be output from the image memory controller 63 to the second image processor 61b. Furthermore, the image data stored in the storage can be output to the external devices such as the network I/F 10 and the media I/F 11 via the external input/output controller 9.

For example, when a scanner application is executed so as to enable the scanner to read the document image and send it outside, and/or upon fax transmission, a painted image is output so as to protect contents of the read document when the background pattern is detected. In this case, the image data on which the damaging processing is performed in the second image processor 61b is stored in the storage of the image memory controller 63. Subsequently, the image data is output to the external devices such as the network I/F 10 and the media I/F 11 via the external input output controller 9.

When the same image is printed out on a plurality of recording sheets, the image data on which the security encoding processing is performed in the second image processor 61b is stored in the storage of the image memory controller 63. The second image processor 61b repeatedly reads out the image data from the storage and outputs the image data to the image writing processor 66.

Furthermore, elements and/or features of different exemplary embodiments may be combined with each other and/or substituted for each other within the scope of this disclosure and appended claims.

The number of constituent elements, locations, shapes and so forth of the constituent elements are not limited to any of the structure for performing the methodology illustrated in the drawings.

Still further, any one of the above-described and other exemplary features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

One or more embodiments of the present invention may be conveniently implemented using a conventional general purpose digital computer programmed according to the teachings of the present specification, as will be apparent to those skilled in the computer art.

Appropriate software coding can readily be prepared by skilled programmers based on the teachings of the present disclosure, as will be apparent to those skilled in the software art.

One or more embodiments of the present invention may also be implemented by the preparation of application specific integrated circuits or by interconnecting an appropriate network of conventional component circuits, as will be readily apparent to those skilled in the art.

Any of the aforementioned methods may be embodied in the form of a system or device, including, but not limited to, any of the structure for performing the methodology illustrated in the drawings.

Furthermore, any of the aforementioned methods may be embodied in the form of a program. The program may be stored on a computer readable media and is adapted to perform any one of the aforementioned methods, when run on a computer device (a device including a processor). The program may include computer executable instructions for carrying one or more of the steps above and/or more aspects of the invention.

Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of a built-in medium include, but are not limited to, rewriteable non-volatile memories, such as ROMs and flash memories, and hard disks.

Examples of a removable medium include, but are not limited to, optical storage media such as CD-ROMs and DVDs; magneto-optical storage media, such as MOs; magnetism storage media, such as floppy disks (trademark), cassette tapes, and removable hard disks; media with a built-in rewriteable non-volatile memory, such as memory cards; and media with a built-in ROM, such as ROM cassettes.

Example embodiments being thus described, it will be obvious that the same may be varied in many ways. Such exemplary variations are not to be regarded as a departure from the spirit and scope of the present invention, and all such modifications as would be obvious to one skilled in the art are intended to be included within the scope of the following claims.

What is claimed is:

1. A security encoding unit, comprising:
   a first image input unit configured to input first original image data of a first image;
   a second image input unit configured to input second original image data of a second image;
   an image memory;
   a controller configured to store, in the image memory, either the first original image data and the second original image data or first security encoded image data of the first image and second security encoded image data of the second image on which security encoding processing is performed;
   a first detector configured to detect first security information of the first image based on the first original image data;
   a second detector configured to detect second security information of the second image based on the second original image data;
   a first security encoding device configured to perform security encoding processing on the first original image data to generate the first security encoded image data;
   a second security encoding device configured to perform security encoding processing on the second original image data to generate the second security encoded image data; and
   a reference information storage unit configured to store first reference information used for detecting the first security information and second reference information used for detecting the second security information, wherein
   the first original image data of the first image and the second original image data of the second image are input simultaneously, and
   the first detector uses the first reference information to detect the first security information, and the second detector uses the second reference information to detect the second security information.

2. The security encoding unit according to claim 1, further comprising:
   a magnification unit configured to change magnification of image data after the security encoding processing.

3. The security encoding unit according to claim 1, wherein the first image input unit and the second image input unit each are configured to read images and simultaneously generate first digitized image data and second digitized image data.

4. The security encoding unit according to claim 1, wherein the first image input unit is configured to simultaneously read an image on a front side of a document while the second image input unit reads an image on a back side of the document to generate the first digitized image data and the second digitized image data, and the first image input unit and the second image input unit simultaneously output the first and the second digital image data.

5. A security encoding unit, comprising:
   a first image input unit configured to input first original image data of a first image;
   a second image input unit configured to input second original image data of a second image;
   an image memory;
   a controller configured to store, in the image memory, either the first original image data and the second original image data or first security encoded image data of the first image and second security encoded image data of the second image on which security encoding processing is performed;
   a first detector configured to detect first security information of the first image based on the first original image data;
   a second detector configured to detect second security information of the second image based on the second original image data;
   a first security encoding device configured to perform security encoding processing on the first original image data to generate the first security encoded image data; and
   a second security encoding device configured to perform security encoding processing on the second original image data to generate the second security encoded image data, wherein
   the first original image data of the first image and the second original image data of the second image are input simultaneously,
   the controller stores the first security encoded image data in the image memory when the first security encoding device performs the security encoding processing, and stores the first original image data of the first image in the image memory when the first security encoding device does not perform the security encoding processing, and
   the controller stores the second security encoded image data in the image memory when the second security encoding device performs the security encoding processing, and stores the second original image data of the second image in the image memory when the second security encoding device does not perform the security encoding processing.

6. The security encoding unit according to claim 5, wherein, when the second detector does not detect the second security information and the first detector detects the first security information, the second security encoding device performs the security encoding processing on the second original image data of the second image based on the first security information to generate the second security encoded image data.

7. The security encoding unit according to claim 5, wherein, when the first detector does not detect the first security information and the second detector detects the second security information, the first security encoding device performs the security encoding processing on the first original image data of the first image based on the second security information to generate the first security encoded image data.

8. A security encoding unit, comprising:
   a first image input unit configured to input first original image data of a first image;
   a second image input unit configured to input second original image data of a second image data;
   an image memory;
   a controller configured to store, in the image memory, the first original image data and the second original image data, read out one of the first and second original image data, and then read out an other one of the first and second original image data;

a detector configured to detect first security information of the first image based on the first original image data of the first image which is read out from the image memory, and detect second security information of the second image based on the second original image data of the second image which is read out from the image memory;

a security encoding device configured to perform security encoding processing on the first original image data based on the first security information to create first security encoded image data, and perform security encoding processing on the second original image data based on the second security information to create second security encoded image data; and a reference information storage unit configured to store first reference information used for detecting the first security information and the second reference information used for detecting the second security information, wherein the first original image data and the second original image data are input simultaneously, the controller provides the detector with the first reference information when reading out the first original image data from the image memory, and provides the detector with the second reference information when reading out the second original image data from the image memory, and the detector detects the first security information and the second security information using the first reference information and the second reference information.

9. A security encoding unit, comprising:

a first image input unit configured to input first original image data of a first image;

a second image input unit configured to input second original image data of a second image data;

an image memory;

a controller configured to store, in the image memory, the first original image data and the second original image data, read out one of the first and second original image data, and then read out an other one of the first and second original image data;

a detector configured to detect first security information of the first image based on the first original image data of the first image which is read out from the image memory, and detect second security information of the second image based on the second original image data of the second image which is read out from the image memory; and a security encoding device configured to perform security encoding processing on the first original image data based on the first security information to create first security encoded image data, and perform security encoding processing on the second original image data based on the second security information to create second security encoded image data, wherein the first original image data and the second original image data are input simultaneously, and, when the controller reads out the one of the first and second original image data and the detector does not currently detect security information based on the one of the first and second original image data but detects security information based on the other one of the first and second original image data, the security encoding device performs the security encoding processing on the first and second original image data based on the detected security information.

10. A security encoding unit, comprising:

a first image input unit configured to input first original image data of a first image;

a second image input unit configured to input second original image data of a second image;

an image memory;

a controller configured to store, in the image memory, either the first original image data and the second original image data or first security encoded image data of the first image and second security encoded image data of the second image on which security encoding processing is performed;

a first detector configured to detect first security information of the first image based on the first original image data;

a second detector configured to detect second security information of the second image based on the second original image data;

a first security encoding device configured to perform security encoding processing on the first original image data to generate the first security encoded image data; and a second security encoding device configured to perform security encoding processing on the second original image data to generate the second security encoded image data, wherein the first original image data of the first image and the second original image data of the second image are input simultaneously, and the first security information and the second security information include a background pattern.

11. The security encoding unit according to claim 10, wherein the background pattern is colored, and the first detector and the second detector detect the background pattern of a specific color.

12. The security encoding unit according to claim 10, wherein the detector generates security encoding instruction data corresponding to the background pattern.

13. The security encoding unit according to claim 12, further comprising:

an image area separator configured to detect a text image area and a non-text area representing an area other than the text area of the original image based on the original image data, wherein, in accordance with the security encoding instruction data, the first security encoding device and the second security encoding device apply image damaging processing on image data of the text image area and the non-text image area, or both areas detected by the image area separator.

14. The security encoding unit according to claim 13, wherein the security encoding instruction data includes area designation data that designates one of the text image area, the non-text area, and both the text image and the non-text areas, and the first security encoding device and the second security encoding device perform the image damaging processing on the image data of the area designated by the area designation data.

15. The security encoding unit according to claim 14, wherein the security encoding instruction data comprises security setting data, and the first security encoding device and the second security encoding device determine, based on the security setting data, whether or not to perform the image damaging processing relative to the area designated by the area designation data.

16. The security encoding unit according to claim 13, wherein the image damaging processing includes painting and/or masking.

17. The security encoding unit according to claim 13, wherein the security encoding unit further generates image data including a plurality of dot pattern sequences so as to form the security encoding instruction data, and the security encoding unit further comprises a background pattern composition unit configured to convert the first original image data and the second original image data in an area other than the text image area and the non-text image area to the image data including the plurality of the dot pattern sequences.

18. The security encoding unit according to claim 17, wherein the magnification unit changes magnification of the converted image data converted by the background pattern composition unit.

* * * * *